(12) United States Patent  (10) Patent No.: US 9,902,199 B2
Iizuka et al.  (45) Date of Patent: Feb. 27, 2018

(54) PNEUMATIC TIRE

(75) Inventors: Toru Iizuka, Kobe (JP); Tomomi Masui, Kobe (JP); Mutsuki Sugimoto, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 459 days.

(21) Appl. No.: 14/353,235

(22) PCT Filed: Jul. 27, 2012

(86) PCT No.: PCT/JP2012/069159
§ 371 (c)(1),
(2), (4) Date: Apr. 21, 2014

(87) PCT Pub. No.: WO2013/069342
PCT Pub. Date: May 16, 2013

(65) Prior Publication Data
US 2014/0246136 A1 Sep. 4, 2014

(30) Foreign Application Priority Data

Nov. 9, 2011 (JP) ................................. 2011-245502
Dec. 9, 2011 (JP) ................................. 2011-270102
Feb. 17, 2012 (JP) ................................. 2012-032590

(51) Int. Cl.
*B60C 1/00* (2006.01)
*B60C 5/14* (2006.01)
(Continued)

(52) U.S. Cl.
CPC ............ *B60C 1/0008* (2013.01); *B32B 25/08* (2013.01); *B32B 25/18* (2013.01); *B32B 27/08* (2013.01);
(Continued)

(58) Field of Classification Search
CPC ....... B60C 1/008; B60C 5/14; B60C 2001/00; B60C 2005/14
See application file for complete search history.

(56) References Cited

U.S. PATENT DOCUMENTS 5,992,486 A 11/1999 Katsuki et al.
2001/0018492 A1 8/2001 Watanabe et al.
(Continued)

FOREIGN PATENT DOCUMENTS

CN 101981120 A 2/2011
CN 102009511 A 4/2011
(Continued)

OTHER PUBLICATIONS

Machine translation of JP 2010-100082, 2010.*

*Primary Examiner* — Justin R Fischer
(74) *Attorney, Agent, or Firm* — Birch, Stewart, Kolasch & Birch, LLP

(57) ABSTRACT

The present invention is a pneumatic tire comprising an inner liner disposed on the inner side of the tire. The inner liner is composed of a sheet made of an elastomer composition containing a styrene-isobutylene-styrene triblock copolymer by more than or equal to 7 percent by mass and less than or equal to 93 percent by mass and an isobutylene-based modified copolymer containing a β-pinene component by more than or equal to 7 percent by mass and less than or equal to 93 percent by mass. In the inner liner, a ratio Gs/Gb between an average thickness Gb in a bead region Rb extending from a tire largest width position to a bead toe and an average thickness Gs in a buttress region Rs extending from the tire largest width position to a corresponding position Lu at a belt layer end is 0.30 to 0.75.

6 Claims, 1 Drawing Sheet

(51) Int. Cl.
*B32B 25/08* (2006.01)
*B32B 25/18* (2006.01)
*B32B 27/08* (2006.01)
*B32B 27/30* (2006.01)
*C08F 8/10* (2006.01)
*C08F 297/00* (2006.01)
*C08L 53/00* (2006.01)

(52) U.S. Cl.
CPC .............. *B32B 27/302* (2013.01); *B60C 5/14* (2013.01); *C08F 8/10* (2013.01); *C08F 297/00* (2013.01); *C08L 53/00* (2013.01); *B32B 2270/00* (2013.01); *B32B 2274/00* (2013.01); *B32B 2307/54* (2013.01); *B32B 2307/71* (2013.01); *B32B 2307/712* (2013.01); *B32B 2307/718* (2013.01); *B32B 2307/724* (2013.01); *B32B 2605/00* (2013.01); *B60C 2005/145* (2013.01)

(56) References Cited

U.S. PATENT DOCUMENTS

| | | |
|---|---|---|
| 2009/0288749 A1 | 11/2009 | Tomoi |
| 2011/0011511 A1 | 1/2011 | Miyazaki et al. |
| 2011/0056604 A1 | 3/2011 | Sugimoto |
| 2011/0077357 A1 | 3/2011 | Sugimoto |
| 2013/0225765 A1* | 8/2013 | Nakabayashi ........ B60C 1/0008 525/184 |

FOREIGN PATENT DOCUMENTS

| | | | |
|---|---|---|---|
| EP | 0 206 756 | A2 | 12/1986 |
| EP | 0 265 053 | B1 | 10/1996 |
| EP | 1900771 | A1 | 3/2008 |
| EP | 2258770 | A1 | 12/2010 |
| GB | 1190766 | * | 5/1970 |
| JP | 62-048704 | A | 3/1987 |
| JP | 64-062308 | A | 3/1989 |
| JP | 09-19987 | A | 1/1997 |
| JP | 2999188 | B1 | 1/2000 |
| JP | 2002-226667 | A | 8/2002 |
| JP | 2003-113286 | * | 4/2003 |
| JP | 2005-343379 | A | 12/2005 |
| JP | 2007-291256 | A | 11/2007 |
| JP | 2008-024219 | A | 2/2008 |
| JP | 2008-127443 | A | 6/2008 |
| JP | 2008-174037 | A | 7/2008 |
| JP | 2009-173051 | A | 8/2009 |
| JP | 2009-298986 | A | 12/2009 |
| JP | 2010-100082 | * | 5/2010 |
| JP | 2010-195864 | A | 9/2010 |
| JP | 2010-195969 | A | 9/2010 |
| JP | 4551005 | B2 | 9/2010 |
| JP | 2011-051320 | A | 3/2011 |
| JP | 2011-074237 | A | 4/2011 |
| JP | 2011-074309 | A | 4/2011 |
| WO | WO 2007/116983 | A1 | 10/2007 |

* cited by examiner

PNEUMATIC TIRE

TECHNICAL FIELD

The present invention relates to a pneumatic tire including an inner liner.

The present invention relates to a pneumatic tire including an inner liner, and particularly to a pneumatic tire in which flection crack growth resulting from repeated flection deformation during traveling with the tire is prevented in the inner liner, in which air permeability resistance and weather resistance are improved.

BACKGROUND ART

In recent years, in response to strong social demands for low fuel consumption of vehicles, weight reduction for tires has been sought in every tire members. Weight reduction of an inner liner has also been sought. The inner liner is disposed on the inner side of a tire, and serves to improve air permeability resistance by reducing an amount of leakage of air (amount of permeating air) from inside to outside of the pneumatic tire.

Currently, a rubber composition for such an inner liner employs, for example, a rubber blend mainly containing a butyl rubber. The rubber blend contains the butyl rubber by 70 percent by mass to 100 percent by mass, and a natural rubber by 30 percent by mass to 0 percent by mass. In this way, the tire is provided with improved air permeability resistance. In addition to butylene, the rubber blend mainly containing the butyl rubber contains isoprene by approximately 1 percent by mass, which acts with sulfur, vulcanization accelerator, and zinc white to achieve co-crosslinking between molecules with an adjacent rubber layer. In the case of normal blend, the above-described butyl-based rubber needs to have a thickness of 0.6 mm to 1.0 mm for a tire of a passenger car, and needs to have a thickness of approximately 1.0 mm to 2.0 mm for a tire of a truck/bus. In order to achieve weight reduction of such tires, polymer which is more excellent in air permeability resistance and can provide an inner liner layer with a thinner thickness than the butyl-based rubber has been requested.

There is a conventional technique of using a thermoplastic elastomer for weight reduction of the inner liner layer. With this technique, however, if the thickness is made thinner than an inner liner of butyl rubber, it is difficult to achieve air permeability resistance and weight reduction at the same time. Moreover, making the thinness smaller decreases the strength of the inner liner, with the result that the inner liner may be broken due to heat and pressure of a bladder during a vulcanization step. Furthermore, in the case of thermoplastic elastomer of low strength, cracks are likely to be produced in the inner liner at a buttress portion which is subjected to large repeated shearing deformation during traveling with the tire.

Conventionally, in order to achieve weight reduction of a tire, it has been proposed to use a film made of a material containing a thermoplastic resin, instead of the above-described rubber composition. However, the tire is left outdoor during transportation or display at a dealer, and suffers from degradation due to ultraviolet radiation of sunlight, so that a thermoplastic elastomer deteriorates to cause a crack, resulting in an impression of bad inner appearance. Moreover, since a pneumatic tire is filled with air in its inner space during use, oxygen in the air will permeate the inside of components constituting the tire, causing oxidation to progress with time. An adverse influence will thus be effected on durability of the pneumatic tire. In particular, if a crack occurs in the inner liner, an impression of bad inner appearance is given to a user. Furthermore, gas barrier property partially deteriorates to decrease tire internal pressure.

In addition, during traveling with the tire, large shear strain acts on the vicinity of a shoulder portion in the inner liner. When the material containing a thermoplastic resin is used as the inner liner, this shear strain is likely to cause detachment at an adhesion interface between the inner liner and the carcass ply, with the result that air leakage takes place from the tire, disadvantageously.

Meanwhile, in order to achieve weight reduction of the inner liner, a technique of employing a thermoplastic elastomer material also has been proposed. However, it is known that a material, which is made thinner in thickness than the inner liner of butyl rubber and exhibits high air permeability resistance, is inferior to the inner liner of butyl rubber in view of vulcanization adhesion strength with an insulation rubber or a carcass ply rubber adjacent to the inner liner.

When the inner liner has low vulcanization adhesion strength, air enters between the inner liner and the insulation rubber or the carcass rubber, thus resulting in a so-called air-in phenomenon, in which small balloon-like objects appear. The multiplicity of such small spots in the tire gives a user an impression of bad appearance. In addition, during traveling, the air causes detachment to result in cracks in the inner liner. Accordingly, the tire internal pressure is decreased.

Japanese Patent Laying-Open No. 9-019987 (PTD 1) discloses a layer stack for improving adhesive property between an inner liner layer and a rubber layer. By providing adhesion layers on the opposite sides of the inner liner layer, the adhesion layers come into contact with each other at an overlapping portion of the inner liner layer and are bonded firmly by heating. Air pressure retainability is thus improved. However, the adhesive layers for the overlapping of the inner liner layer will come into contact with the bladder in a heated state during a vulcanization step to stick and adhere to the bladder, disadvantageously.

In Japanese Patent No. 2999188 (Japanese Patent Laying-Open No. 2000-159936 (PTD 2)), a mixture of a nylon resin having excellent air permeability resistance and a butyl rubber is produced by dynamic cross-linking, thereby fabricating an inner liner layer having a thickness of 100 µm. However, the nylon resin is hard at a room temperature, and is therefore not suitable for an inner liner for a tire. Further, the mixture produced by dynamic cross-linking is not enough to achieve vulcanization adhesion with a rubber layer. Hence, an adhesive layer for vulcanization is required apart from the inner liner layer. This results in a complicated structure as an inner liner member as well as increased number of steps, which is disadvantageous in view of productivity.

In Japanese Patent Laying-Open No. 2008-024219 (PTD 3), a flexible gas barrier layer is fabricated by dispersing a maleic anhydride modified hydrogenated styrene-ethylene-butadiene-styrene block copolymer in an ethylene-vinyl alcohol copolymer having excellent air permeability resistance. The layer is sandwiched by thermoplastic polyurethane layers to form a sandwich structure, and a rubber cement (obtained by dissolving a butyl rubber and a natural rubber at 70/30 in toluene) is applied to a surface to be adhered to the tire rubber, thereby fabricating an inner liner layer. However, the modified ethylene-vinyl alcohol copolymer having the flexible resin dispersed therein has low adhesive strength, and may be detached from the thermoplastic polyurethane layers. Moreover, although the modified ethylene-vinyl alcohol copolymer having flexible resin dispersed therein has flexible resin dispersed therein, the EVOH of the matrix has poor flection fatigue resistance, thus resulting in breakage during traveling with the tire. Since the rubber cement is applied to the surface to be adhered to the tire rubber, a step different from the normal inner liner step is required, resulting in degraded productivity.

Japanese Patent Laying-Open No. 2008-174037 (PTD 4) proposes a pneumatic tire having, on the inner side of a carcass layer, an air permeation preventing layer of a thermoplastic elastomer composition containing a thermoplastic resin or a thermoplastic resin and an elastomer, in which an average thickness Gs of the air permeation prevention layer extending from the vicinity of a maximum width end of a belt layer to a tire maximum width region Ts is made thinner than an average thickness Gf of the air permeation preventing layer in a region Tf extending from the tire maximum width to a bead toe, thereby improving flection durability. Such a configuration, however, may cause detachment between a rubber layer of a carcass ply and the air permeation preventing layer.

To simultaneously achieve suppression of air pressure drop, improvement in durability and improvement in fuel consumption, Japanese Patent Laying-Open No. 2007-291256 (PTD 5) discloses a pneumatic tire formed using a rubber composition for an inner liner containing ethylene-vinyl alcohol copolymer by 15 parts by mass to 30 parts by mass with respect to 100 parts by mass of a rubber component made of a natural rubber and/or a synthetic rubber.

In Japanese Patent Laying-Open No. 2009-298986 (PTD 6), titanium oxide is blended with a blend of a butyl-based rubber and a nylon resin for preventing ultraviolet degradation. However, besides ultraviolet degradation, durability is disadvantageously decreased by degradation of nylon resin due to occurrence of radical caused by flection fatigue.

In WO2007/116983 (PTD 7), a light sealing layer in which carbon black is blended with a mold lubricant for preventing ultraviolet degradation of a thermoplastic elastomer layer is provided on a surface layer. However, due to fluctuations in the step of applying the mold lubricant, the mold lubricant cannot be applied uniformly in the inner surface of the tire. If a scratch is made by the hand of an operator in the step or a user, or for another reason, the light sealing layer does not achieve its function, resulting in degraded durability due to ultraviolet degradation.

Japanese Patent Laying-Open No. 2005-343379 (PTD 8) achieves improvement in low temperature durability by designing the thickness at a shoulder part larger than the thickness at a tire crown portion. The thickness at the shoulder part is designed to be thicker than that at the tire crown portion to suppress flection deformation and reduce the occurrence of cracks, however, it is disadvantageous in view of weight reduction of a tire.

CITATION LIST

Patent Document

PTD 1: Japanese Patent Laying-Open No. 9-019987
PTD 2: Japanese Patent No. 2999188 (Japanese Patent Laying-Open No. 2000-159936)
PTD 3: Japanese Patent Laying-Open No. 2008-024219
PTD 4: Japanese Patent Laying-Open No. 2008-174037
PTD 5: Japanese Patent Laying-Open No. 2007-291256
PTD 6: Japanese Patent Laying-Open No. 2009-298986
PTD 7: WO2007/116983
PTD 8: Japanese Patent Laying-Open No. 2005-343379

SUMMARY OF INVENTION

Technical Problem

A first subject of the present invention is to provide a pneumatic tire including an inner liner, in which air permeability resistance, flection fatigue resistance and crack resistance are improved.

A second subject of the present invention is to provide a pneumatic tire including an inner liner, in which detachment strength between the inner liner and a carcass ply is increased, and air permeability resistance, flection fatigue resistance and crack resistance are further improved.

A third subject of the present invention is to provide a pneumatic tire including an inner liner, in which flection crack growth resulting from repeated flection deformation during traveling with the tire is prevented in the inner liner, and in which weather resistance, air permeability resistance and rolling resistance are improved as a whole.

Solution to Problem

In relation to the first subject, the present invention relates to a pneumatic tire including an inner liner disposed on an inner side of the tire. The inner liner is composed of a sheet made of an elastomer composition containing an elastomer component in which a styrene-isobutylene-styrene triblock copolymer by more than or equal to 7 percent by mass and less than or equal to 93 percent by mass and an isobutylene-based modified copolymer containing a β-pinene component by more than or equal to 7 percent by mass and less than or equal to 93 percent by mass are mixed. In the inner liner, a ratio Gs/Gb between an average thickness Gb in a bead region Rb extending from a tire largest width position to a bead toe and an average thickness Gs in a buttress region Rs extending from the tire largest width position to a corresponding position Lu at a belt layer end is 0.30 to 0.75.

Desirably, the styrene-isobutylene-styrene triblock copolymer contains a styrene component at a content of 10 percent by mass to 30 percent by mass, and has a weight average molecular weight of 50,000 to 400,000. Preferably, the isobutylene-based modified copolymer is contained by more than or equal to 10 percent by mass and less than or equal to 90 percent by mass in the elastomer component of the elastomer composition.

Preferably, β-pinene in the isobutylene-based modified copolymer is contained at a content of 0.5 percent by mass to 25 percent by mass. Preferably, the isobutylene-based modified copolymer has a weight average molecular weight Mw of 30,000 to 300,000, and a value of a molecular weight distribution (weight average molecular weight Mw/number average molecular weight Mn) is less than or equal to 1.3.

Preferably, the average thickness Gs in the buttress region of the inner liner is 0.05 mm to 0.45 mm.

In relation to the second subject, the present invention relates to a pneumatic tire including an inner liner disposed on an inner side of the tire. The inner liner is composed of a polymer sheet made of an elastomer composition containing a SIBS modified copolymer obtained by modifying a styrene block portion of a styrene-isobutylene-styrene triblock copolymer with one of acid chloride and acid anhydride having an unsaturated bond. In the inner liner, a ratio (Gs/Gb) between an average thickness Gb in a bead region Rb extending from a tire largest width position to a bead toe and an average thickness Gs in a buttress region Rs extending from the tire largest width position to a corresponding position Lu at a belt layer end is 0.30 to 0.75.

Desirably, the styrene-isobutylene-styrene triblock copolymer contains a styrene component at a content of 10 percent by mass to 30 percent by mass, and has a weight average molecular weight ranging from 50,000 to 400,000. Desirably, the SIBS modified copolymer is contained by more than or equal to 10 percent by mass and less than or equal to 100 percent by mass in an elastomer component.

In the present invention, the elastomer component can be a mixture of the styrene-isobutylene-styrene triblock copolymer and the SIBS modified copolymer. Desirably, the elastomer composition has blended therein a tackifier by 0.1 part by mass to 100 parts by mass relative to 100 parts by mass of an elastomer component. In the present invention, desirably, the average thickness Gs in the buttress region of the inner liner is 0.05 mm to 0.40 mm.

In relation to the third subject, the present invention relates to a pneumatic tire having a carcass layer extending from a tread portion to bead portions on both sides thereof, a belt layer on an outer side of a crown portion thereof, and an inner liner disposed on an inner side of the carcass layer. The inner liner is composed of a first layer disposed on an inner side of the tire, and a second layer disposed in contact with a rubber layer of the carcass ply. (A) The first layer is an elastomer composition containing a thermoplastic elastomer, an ultraviolet absorber and an antioxidant, the thermoplastic elastomer containing at least one of a styrene-isobutylene-styrene block copolymer and a SIBS modified copolymer obtained by modifying a styrene block portion of a styrene-isobutylene-styrene block copolymer with one of acid chloride and acid anhydride having an unsaturated bond. (B) The second layer contains an elastomer containing at least one of a styrene-isoprene-styrene block copolymer and a styrene-isobutylene block copolymer. The first layer and the second layer are elastomer compositions containing the ultraviolet absorber and the antioxidant by 0.5 percent by mass to 40 percent by mass in total of an elastomer component. In the inner liner, an average thickness Gs in a buttress region Rs extending from a tire largest width position to a corresponding position Lu at a belt layer end is thinner than an average thickness Gb in a bead region Rb extending from the tire largest width position to a bead toe.

Preferably, a total blending amount of the ultraviolet absorber and the antioxidant in the first and second layers is 0.5 percent by mass to 40 percent by mass of the elastomer component.

Preferably, a ratio (Gs/Gb) between the average thickness Gs in the buttress region and the average thickness Gb in the bead region of the inner liner is 0.5 to 0.7.

Preferably, the average thickness Gs in the buttress region of the inner liner is 0.06 mm to 0.30 mm.

More preferably, the elastomer composition of one of the first layer and the second layer has blended therein the SIBS modified copolymer by 5 percent by mass to 100 percent by mass of the elastomer component.

Preferably, the elastomer composition of one of the first layer and the second layer has blended therein one of a tackifier and polyisobutylene.

Advantageous Effects of Invention

A first effect of the present invention is as follows. According to the present invention, the inner liner is composed of an elastomer composition containing a styrene-isobutylene-styrene triblock copolymer and an isobutylene-based modified copolymer containing β-pinene. Therefore, the thickness thereof can be made thin while maintaining air permeability resistance. Adhesive property with an adjacent rubber layer can also be improved, and flection fatigue resistance is further improved. As for the average thickness of the inner liner composed of the above-described elastomer composition, an average thickness (Gb) in bead region Rb is made thicker within a certain range than Gs in buttress region Rs. Therefore, stress resulting from repeated flection deformation during traveling with the tire can be effectively relaxed while maintaining air permeability resistance and flection fatigue resistance. Crack resistance is thus improved.

The second effect of the present invention is as follows. According to the present invention, in order to effectively relax shearing stress in the buttress portion in which stress concentration resulting from repeated flection deformation during traveling with the tire is likely to occur, the ratio between average thickness Gb in bead region Rb and average thickness Gs in buttress region Rs of the inner liner is adjusted, and an elastomer composition containing a modified SIBS is used for the inner liner. Accordingly, a pneumatic tire increased in adhesive property with an adjacent rubber layer and improved in air shutoff property, flection fatigue resistance and crack resistance can be obtained while maintaining the thickness of the inner liner thin.

The third effect of the present invention is as follows. The present invention effectively relaxes stress on the buttress region resulting from repeated flection deformation by making the ratio (Gs/Gb) between average thickness Gs in buttress region Rs and average thickness Gb in bead region Rb of the inner liner smaller than 1. In addition, a thermoplastic elastomer composition containing a styrene-isobutylene-styrene block copolymer (SIBS) is used for the inner liner. Here, a composition containing the SIBS and the like is likely to suffer from degradation in a wavelength range of an ultraviolet wavelength of more than or equal to 290 nm. Then, by blending an ultraviolet absorber with the thermoplastic elastomer composition, a function is provided which absorbs light around 320 nm to 350 nm where degradation is most likely to occur and convert the light into molecular vibrational energy or thermal energy, thereby protecting the thermoplastic elastomer from ultraviolet light. Here, the ultraviolet absorber also includes a light stabilizer.

Moreover, in the thermoplastic elastomer, a radical is produced due to flection fatigue during traveling with the tire. The radical induces linked degradation of a main chain, and invites cracks and destruction of the inner liner made of the thermoplastic elastomer composition. Then, blending an antioxidant serves to capture the radical produced by flection fatigue and prevent degradation. Here, the antioxidant also includes an oxygen absorber.

DESCRIPTION OF EMBODIMENTS

First Embodiment

<Pneumatic Tire>

Figure 1:
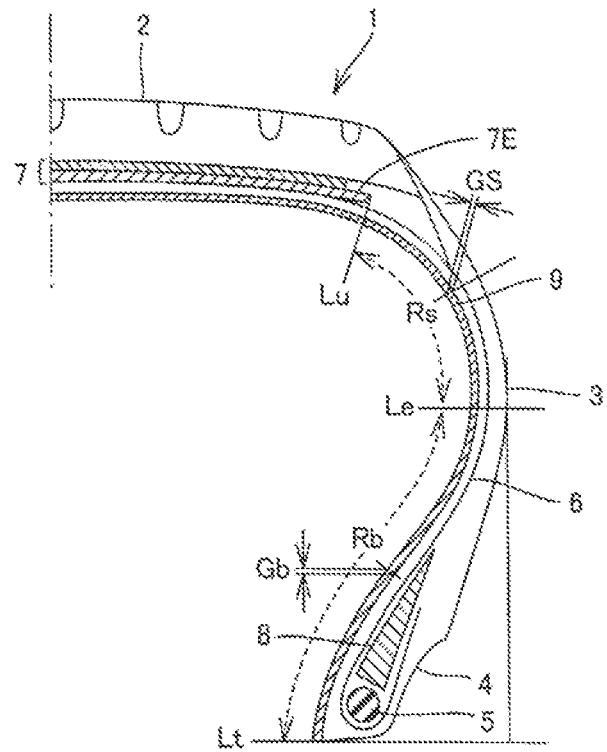
FIG. 1 is a schematic cross sectional view showing the right half of a pneumatic tire according to an embodiment of the present invention.

The following describes an embodiment of a pneumatic tire of the present invention with reference to the drawings. FIG. 1 is a schematic cross sectional view of the right half of a pneumatic tire for a passenger car. Pneumatic tire 1 includes a tread portion 2, and a sidewall portion 3 and bead portions 4 so as to form a shape of toroid from the opposite ends of the tread portion. In each of bead portions 4, a bead core 5 is embedded. Further, a carcass ply 6 and a belt layer 7 are disposed. Carcass ply 6 is provided to extend from one bead portion 4 to the other bead portion, and is anchored by folding its ends around bead cores 5. Belt layer 7, which is formed of at least two plies, is disposed outside a crown portion of carcass ply 6.

Belt layer 7 is disposed such that two plies, which are formed of steel cords or cords of aramid fibers or the like, are arranged to allow the cords to cross each other between the plies normally at an angle of 5° to 30° relative to the tire circumferential direction. It should be noted that topping rubber layers can be provided on the outer side of the opposite ends of the belt layer to reduce detachment in the opposite ends of the belt layer. Further, in the carcass ply, organic fiber cords such as polyester, nylon, or aramid are arranged at substantially 90° relative to the tire circumferential direction. In a region surrounded by the carcass ply and its folded portion, a bead apex 8 is disposed to extend from the upper end of bead core 5 in the sidewall direction. Further, an inner liner 9 is disposed on the inner side of carcass ply 6 in the tire radial direction, so as to extend from one bead portion 4 to the other bead portion 4.

In the present invention, an average thickness Gs of inner liner 9 in a buttress region Rs extending from tire largest width position Le to a corresponding position Lu at the end of the belt layer is formed to be thinner than an average thickness Gb of inner liner 9 in a bead region Rb extending from tire largest width position Le to a bead toe Lt.

By making the average thickness (Gs) of the inner liner in buttress region Rs thinner, even if shearing deformation takes place due to repeated flection deformation in this region during traveling with the tire, resultant stress can be relaxed to prevent cracks from occurring.

In order to effectively relax stress caused by flection deformation, the ratio (Gs/Gb) between average thickness Gs in buttress region Rs and average thickness Gb in bead region Rb of the inner liner is adjusted to fall within a range of 0.30 to 0.75. In order to attain the effect of relaxing stress in the buttress region while maintaining air permeability resistance, average thickness Gs in buttress region Rs of the inner liner is desirably 0.05 mm to 0.45 mm.

<Elastomer Composition>

In the present invention, the inner liner is composed of an elastomer composition containing an elastomer component in which a styrene-isobutylene-styrene triblock copolymer (hereinafter also referred to as "SIBS") and an isobutylene-based modified copolymer containing β-pinene are mixed.

The elastomer composition contains an elastomer component in which a styrene-isobutylene-styrene triblock copolymer by more than or equal to 7 percent by mass and less than or equal to 93 percent by mass and an isobutylene-based modified copolymer containing a β-pinene component by more than or equal to 7 percent by mass and less than or equal to 93 percent by mass are mixed. Preferably, the isobutylene-based modified copolymer containing β-pinene ranges from 10 percent by mass to 90 percent by mass of the entire elastomer component. If the isobutylene-based modified copolymer is less than 7 percent by mass, vulcanization adhesion strength with an adjacent carcass ply may be reduced. On the other hand, if the isobutylene-based modified copolymer exceeds 93 percent by mass, air permeability resistance and crack resistance will be degraded.

<SIBS>

Because of the isobutylene block in the SIBS, a film containing the SIBS has excellent air permeability resistance. Therefore, by using this for an inner liner, a pneumatic tire excellent in air permeability resistance can be obtained. Moreover, since the molecular structure of the SIBS is completely saturated except aromatic side chain, hardening degradation is suppressed, and when the SIBS is applied to a tire, the tire has excellent durability. Furthermore, since the SIBS has high air permeability resistance, it is not necessary to use a halogenated rubber, such as a halogenated butyl rubber, which has been conventionally used to provide air permeability resistance and has a high specific gravity. Accordingly, weight reduction of the tire can be achieved, thus improving fuel efficiency.

As to the molecular weight of the SIBS, the SIBS preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be unfavorably decreased. On the other hand, when the weight average molecular weight thereof exceeds 400,000, extrusion workability may unfavorably become bad. In order to further improve air permeability resistance and durability, the SIBS preferably contains the styrene component at a content of 10 percent by mass to 30 percent by mass, preferably 14 percent by mass to 23 percent by mass.

In the copolymer of the SIBS, the isobutylene block preferably has a degree of polymerization in a range of approximately 10,000 to 150,000, and the styrene block preferably has a degree of polymerization in a range of approximately 5,000 to 30,000, in view of rubber elasticity and handling (when the degree of polymerization is less than 10,000, each block will be in a liquid form). The SIBS can be obtained through a general living cationic polymerization method for a vinyl-based compound.

<Isobutylene-Based Modified Copolymer>

In the present invention, the isobutylene-based modified copolymer is an isobutylene-based modified copolymer made of a polymeric block (A) mainly containing isobutylene and a polymeric block (B) mainly containing an aromatic vinyl-based compound, and is a random copolymer in which at least one block contains β-pinene.

The polymeric block (A) containing isobutylene as a main component is a polymeric block containing a unit whose soft segment originates in isobutylene by more than or equal to 80 percent by mass. This polymeric block can be produced using aliphatic olefins, dienes, vinyl ethers, silanes, vinylcarbazole, acenaphthylene, or the like as a monomer component.

On the other hand, the polymeric block (B) mainly containing an aromatic vinyl-based compound is a polymeric block containing a unit whose hard segment originates in the aromatic vinyl-based compound by more than or equal to 80 percent by mass.

Examples of the aromatic vinyl-based compound include styrene, methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p- methylstyrene, β-methyl-o-methylstyrene, β-methyl-m-methylstyrene, β-methyl-p-methylstyrene, 2,4,6-trimethyl styrene, α-methyl-2,6-dimethylstyrene, α-methyl-2,4-dimethylstyrene, β-methyl-2,6-dimethylstyrene, β-methyl-2,4-dimethylstyrene, chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, t-butylstyrene, methoxy styrene, chloromethylstyrene, bromomethylstyrene, and the like. Particularly in view of cost, styrene and α-methylstyrene are preferable.

In the isobutylene-based modified copolymer of the present invention, at least one block of the polymeric blocks (A) and (B) is a random copolymer with β-pinene. in view of low temperature characteristics, copolymerization with the polymeric block (B) mainly containing an aromatic vinyl-based compound is preferable.

On the other hand, in view of adhesive property, copolymerization with the polymeric block (A) mainly containing isobutylene is preferable. In this case, the content of β-pinene is preferably 0.5 percent by mass to 25 percent by mass of the isobutylene-based modified copolymer, and more preferably 2 percent by mass to 25 percent by mass. If the content of β-pinene is less than 0.5 percent by mass, adhesive property is insufficient. If the content of β-pinene exceeds 25 percent by mass, the copolymer will be fragile, and rubber elasticity is likely to decrease The constitution of the isobutylene-based modified copolymer of the present invention is not particularly limited. Any of a block copolymer, a triblock copolymer, a multi-block copolymer and the like having a straight-chain, branched or star-like molecular chain structure can be selected. In view of property balance and molding workability, as for the polymeric blocks (A) and (B), the constitution of a diblock copolymer ((A)-(B)) or a triblock copolymer ((B)-(A)-(B)) can be adopted. They can be used alone independently or two or more of them can be used in combination to obtain desired physical properties and molding workability.

The isobutylene-based modified copolymer preferably has a weight average molecular weight of 30,000 to 300,000, particularly preferably 30,000 to 150,000 measured through GPC measurement, in view of flowability, shaping workability, rubber elasticity, and the like. If the weight average molecular weight is less than 30,000, mechanical physical properties are less likely to be fully exhibited. On the other hand, if the weight average molecular weight exceeds 300,000, flowability and workability are likely to degrade. Furthermore, in view of processing stability, the value of a molecular weight distribution of the isobutylene-based modified copolymer (weight average molecular weight/number average molecular weight) is less than or equal to 1.3.

<Method for Producing Isobutylene-Based Modified Copolymer>

A method for producing an isobutylene-based modified copolymer is disclosed in Japanese Patent Laying-Open No. 2010-195969, for example. For example, the copolymer can be produced by polymerizing the above-described monomer component in the presence of a polymerization initiator expressed by the following general formula (1).

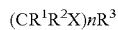  (1)

(wherein X is a substituent selected from a halogen atom, alkoxy groups or acyloxy groups having 1 to 6 carbon atoms, each of $R^1$ and $R^2$ is a hydrogen atom or a monovalent hydrocarbon group having 1 to 6 carbon atoms, $R^1$ and $R^2$ may be the same or may be different, $R^3$ is a monovalent or multivalent aromatic hydrocarbon group or a monovalent or multivalent aliphatic hydrocarbon group, and n indicates a natural number of 1 to 6).

The compound expressed by the above-mentioned general formula (1) serves as an initiator, and generates carbonium ion in the presence of Lewis acid or the like, and serves as a starting point of cationic polymerization. Examples of the compound of the above-mentioned general formula (1) include bis(1-chlor-1-methylethyl)benzene $[C_6H_4(C(CH_3)_2Cl)_2]$ and tris(1-chlor-1-methylethyl)benzene $[(ClC(CH_3)_2)_3C_6H_3]$.

When producing the isobutylene-based modified copolymer, a Lewes acid catalyst can also coexist further. The Lewis acid can be used for cationic polymerization, and a metal halide such as $TiCl_4$, $TiBr_4$, $BCl_3$, $BF_3$, $BF_3OEt_2$, $ZnBr_2$, or $AlCl_3$ and an organic metal halide such as $Et_2AlCl$ or $EtAlCl_2$ can be used, for example. The above-mentioned Lewis acid can be used by 0.1 molar equivalent to 100 molar equivalent with respect to the compound indicated by the general formula (1).

When producing the isobutylene-based modified copolymer, an electron donor component can also exist. Examples of this electron donor component include pyridines, amines, amides, and sulfoxides.

Polymerization of the isobutylene-based modified copolymer can be performed in an organic solvent, and an organic solvent that does not inhibit cationic polymerization can be used here. For example, halogenated hydrocarbons such as methyl chloride, dichloromethane, chloroform, ethyl chloride, and dichloroethane, alkylbenzenes such as benzene, toluene, xylene, and ethylbenzene, straight aliphatic hydrocarbons such as ethane, propane, butane, pentane, hexane, and heptane, branched aliphatic hydrocarbons such as 2-methylpropane and 2-methylbutane, cyclic aliphatic hydrocarbons such as cyclohexane, methylcyclohexane, and ethylcyclohexane, and the like can be used.

In view of viscosity adjustment and heat dissipation of a copolymer solution to be generated, the amount of the above-described organic solvent is adjusted such that the concentration of the copolymer is 5 percent by mass to 40 percent by mass. It is noted that the copolymerization reaction preferably occurs in a range of −20° C. to −70° C.

<Third Elastomer Component>

The elastomer composition of the inner liner in the present invention can be blended with another thermoplastic elastomer, particularly, a styrene-based thermoplastic elastomer, in a range less than or equal to 30 percent by mass of the elastomer component. Here, the styrene-based thermoplastic elastomer refers to a copolymer including a styrene block as a hard segment. Examples thereof include: a styrene-isoprene-styrene block copolymer (hereinafter, also referred to as "SIS"); a styrene-isobutylene block copolymer (hereinafter, also referred to as "SIB"); a styrene-butadiene-styrene block copolymer (hereinafter, also referred to as "SBS"); a styrene-ethylene butene-styrene block copolymer (hereinafter, also referred to as "SEBS"); a styrene-ethylene propylene-styrene block copolymer (hereinafter, also referred to as "SEPS"); a styrene-ethylene ethylene propylene-styrene block copolymer (hereinafter, also referred to as "SEEPS"); and a styrene-butadiene butylene-styrene block copolymer (hereinafter, also referred to as "SBBS").

Further, the styrene-based thermoplastic elastomer may have an epoxy group in its molecular structure. A usable example thereof is Epofriend A1020 provided by Daicel Chemical Industries Ltd., i.e., an epoxy modified styrene-butadiene-styrene copolymer (epoxidized SBS) (having a weight average molecular weight of 100,000 and an epoxy equivalent of 500).

It is noted that the thickness of the inner liner of the present invention differs between the bead region and the buttress region as described above, but is desirably adjusted in a range of 0.05 mm to 2.0 mm. If the thickness is less than 0.05 mm, the inner liner may be broken by pressing pressure when vulcanizing the raw tire, with the result that an air leakage phenomenon may take place in the vulcanized tire. On the other hand, if the thickness of the inner liner exceeds 2.0 mm, the weight of the tire is increased to result in disadvantageous performance in fuel efficiency. For the inner liner, a general method for forming thermoplastic elastomer into a film, such as extrusion molding or calender molding, can be used.

Second Embodiment

<Pneumatic Tire>
In the present embodiment, the structure of a pneumatic tire can be similar to that of the first embodiment.
<Polymer Sheet>
(SIBS Modified Copolymer)
In the present invention, a polymer sheet used for the inner liner is a thermoplastic elastomer composition containing a SIBS modified copolymer obtained by modifying a styrene block portion of a styrene-isobutylene-styrene block copolymer (hereinafter also referred to as "SIBS") with acid chloride or acid anhydride having an unsaturated bond.

The above-described polymer sheet preferably contains a SIBS modified copolymer by 10 percent by mass to 100 percent by mass of an elastomer component. Here, the SIBS modified copolymer has its styrene block portion modified with acid chloride or acid anhydride having an unsaturated bond, and contains a chemical constitution of the following formula (1) in the molecular chain.

[Formula 1]

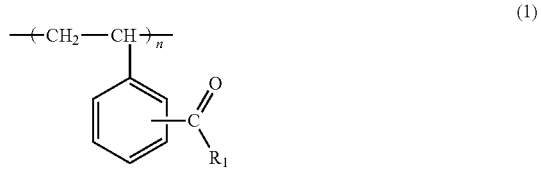

(1)

In Formula (1), $R_1$ is a monovalent organic group having a functional group.

Examples of acid chloride having an unsaturated bond used for modification in the present invention include methacrylic acid chloride, methacrylic acid bromide, methacrylic acid iodide, acrylic acid chloride, acrylic acid bromide, acrylic acid iodide, crotonic acid chloride, and crotonic acid bromide. In particular, methacrylic acid chloride and acrylic acid chloride are suitable.

Examples of acid anhydride include acetic anhydride, maleic anhydride, phthalic anhydride, and the like. Acetic anhydride is particularly suitable. Two or more of these compounds can also be used in combination. Through such modification, the unsaturated group is introduced into the SIBS, which enables crosslinking through use of a cross linking agent.

As described above, the blending amount of the SIBS modified copolymer ranges from 10 percent by mass to 100 percent by mass, preferably 30 percent by mass to 100 percent by mass of the elastomer component. If the blending amount of the SIBS modified copolymer is less than 10 percent by mass of the elastomer component, vulcanization adhesion between the inner liner and the carcass ply rubber may be insufficient.

The SIBS modified copolymer contains acid chloride and acid anhydride having an unsaturated bond at a content of more than or equal to 1 percent by weight, preferably more than or equal to 5 percent by weight, and less than or equal to 30 percent by weight. In order to crosslink the SIBS modified copolymer, a conventional method can be used. For example, thermal crosslinking by heating or crosslinking by a cross linking agent can be performed. As the cross linking agent, organic peroxide, such as, for example, dicumylperoxide, di-tert-butyl peroxide, 2,5-dimethyl-2,5-di-(tert-butylperoxy) hexane, or the like can be used. The blending amount of organic peroxide preferably ranges from 0.1 part by mass to 3.0 parts by mass relative to 100 parts by mass of the thermoplastic elastomer component.

In the elastomer composition of the polymer sheet of the present invention, polyfunctional vinyl monomer such as divinylbenzene or triaryl cyanurate, or a polyfunctional methacrylate monomer such as ethylene glycol dimethacrylate, diethylene glycol dimethacrylate, triethylene glycol dimethacrylate, polyethylene glycol dimethacrylate, trimethylolpropane trimetacrylate, or allyl methacrylate can be used in combination as a cross linking agent. In this case, the composition after crosslinking can be expected to have improved flection crack characteristics.

Because of the isobutylene block in the SIBS modified copolymer, a film made of the SIBS modified copolymer has excellent air permeability resistance. Moreover, since the unsaturated group is introduced into the SIBS, the SIBS modified copolymer enables thermal crosslinking and crosslinking by a cross linking agent. Thus, flection crack characteristics and air permeability resistance are improved together with basic characteristics such as tensile strength, break elongation and permanent strain. The characteristics as the inner liner are thus improved.

When manufacturing a pneumatic tire by applying a polymer film made of an elastomer composition containing the SIBS modified copolymer to the inner liner, air permeability resistance can be secured. Therefore, it is not necessary to use a halogenated rubber, such as a halogenated butyl rubber, which has been conventionally used to provide air permeability resistance and has a high specific gravity. Even if it is used, an amount of usage thereof can be reduced. Accordingly, weight reduction of the tire can be achieved, thus obtaining the effect of improving fuel efficiency.

The molecular weight of the SIBS modified copolymer is not particularly limited, but the SIBS modified copolymer preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be unfavorably decreased. On the other hand, when the weight average molecular weight thereof exceeds 400,000, extrusion workability may unfavorably become bad. In order to further improve air permeability resistance and durability, the SIBS modified copolymer preferably contains the styrene component at a content of 10 percent by mass to 30 percent by mass, preferably 14 percent by mass to 23 percent by mass.

(Production of SIBS Modified Copolymer)

The SIBS can be obtained through a general living cationic polymerization method for a vinyl-based compound. For example, each of Japanese Patent Laying-Open No. 62-48704 and Japanese Patent Laying-Open No. 64-62308 discloses that living cationic polymerization between isobutylene and another vinyl compound is possible and use of isobutylene and another compound for a vinyl compound allows for production of a polyisobutylene-based block copolymer.

For producing the SIBS modified copolymer, the following method can be adopted, for example. A styrene-isobutylene-styrene block copolymer is input into a separable flask, and then the atmosphere in a polymerization container is substituted by nitrogen. Then, an organic solvent (e.g., n-hexane and butyl chloride) having been dried with molecular sieves is added, and methacrylic acid chloride is further added. At last, aluminum trichloride is added while stirring the solution to produce a reaction. A predetermined amount of water is added to the reaction solution after a certain period of time since the start of reaction, and the solution is stirred. The reaction is then terminated. The reaction solution is washed several times or more with a large amount of water, and further, slowly dropped into a large amount of a methanol-acetone mixed solvent to precipitate a polymer. The resulting polymer is vacuum dried. It is noted that the method of producing the SIBS modified copolymer is disclosed in Japanese Patent No. 4551005, for example.

(Thermoplastic Elastomer Composition Containing SIBS Modified Copolymer)

The above-described polymer composition is an elastomer composition containing the SIBS modified copolymer. That is, the SIBS modified copolymer is preferably contained in the elastomer component by more than or equal to 10 percent by mass, and further, more than or equal to 35 percent by mass. Here, although a styrene-based thermoplastic elastomer, an urethane-based thermoplastic elastomer or the like can be suitably used for the elastomer component, SIBS, SIS or SIB is particularly preferable.

In the present invention, a rubber component can be blended into the elastomer composition. By blending the rubber component, tackiness with an adjacent carcass ply in an unvulcanized state can be provided, and vulcanization adhesive property with the carcass ply or the insulation can be increased through vulcanization. As the rubber component, at least one selected from the group consisting of a natural rubber, an isoprene rubber, a chloroprene rubber, and a butyl rubber is preferably contained. The blending amount of the rubber component preferably ranges from 5 percent by mass to 75 percent by mass in the polymer component.

(Tackifier)

In the present invention, a tackifier can be blended into the elastomer composition for an inner liner in a range of 0.1 part by mass to 100 parts by mass with respect to 100 parts by mass of the elastomer component. Here, the tackifier refers to a compounding agent for increasing tackiness of the elastomer composition. Examples of such a tackifier will be illustrated below.

Typically, there are C9 petroleum resin and C5 petroleum resin. Here, a C9 petroleum resin is an aromatic petroleum resin obtained by polymerizing C5 to C9 fractions (mainly C9 fraction) in a mixed state. The C5 to C9 fractions are remnants when obtaining useful compounds, such as ethylene, propylene, and butadiene, by thermally decomposing naphtha. Examples thereof include products such as: ARKON P70, P90, P100, P125, P140, M90, M100, M115, and M135 (each provided by Arakawa Chemical Industries, Ltd., and having a softening point of 70° C. to 145° C.); I-MARV S100, S110, P100, P125, and P140 (aromatic copolymer-based hydrogenated petroleum resins each provided by Idemitsu Petrochemical Ltd., and having a softening point of 100° C. to 140° C., a weight average molecular weight of 700 to 900, and a bromine number of 2.0 g/100 g to 6.0 g/100 g); and Petcoal XL (provided by TOSOH Corporation).

A C5 petroleum resin is an aliphatic petroleum resin obtained by polymerizing C4 to C5 fractions (mainly C5 fraction) in a mixed state. The C4 to C5 fractions are remnants when obtaining useful compounds, such as ethylene, propylene, and butadiene, by thermally decomposing naphtha. Examples thereof include products such as: Hilets G100 (provided by Mitsui Petrochemicals Industries, Ltd., and having a softening point of 100° C.); Marcalets T100AS (provided by Maruzen Petrochemical Co., Ltd., and having a softening point of 100° C.); and Escorez 1102 (provided by Tonex Co., Ltd., and having a softening point of 110° C.).

Examples of the terpene resin include products such as: YS resin PX800N, PX1000, PX1150, PX1250, and PXN1150N; and Clearon P85, P105, P115, P125, P135, P150, M105, M115, and K100 (each provided by Yasuhara Chemical Co., Ltd., and having a softening point of 75° C. to 160° C.).

Examples of the aromatic modified terpene resin include products such as: YS resin TO85, TO105, TO115, and TO125 (each provided by Yasuhara Chemical Co., Ltd., and having a softening point of 75° C. to 165° C.).

Examples of the terpene phenol resin include products such as: Tamanol 803L, 901 (provided by Arakawa Chemical Industries Co., Ltd., and having a softening point of 120° C. to 160° C.); and YS Polyster U115, U130, T80, T100, T115, T145, and T160 (each provided by Yasuhara Chemical Co., Ltd., and having a softening point of 75° C. to 165° C.).

Examples of the cumarone resin include a cumarone resin having a softening point of 90° C. (provided by Kobe Oil Chemical Industrial Co., Ltd.). Examples of the cumarone indene oil include products such as 15E (provided by Kobe Oil Chemical Industrial Co., Ltd., and having a pour point of 15° C.).

Examples of the rosin ester include products such as: ester gum AAL, A, AAV, 105, AT, H, HP, and HD (each provided by Arakawa Chemical Industries Co., Ltd., and having a softening point of 68° C. to 110° C.); and Hariester TF, S, C, DS70L, DS90, and DS130 (each provided by Harima Chemicals Inc., and having a softening point of 68° C. to 138° C.). Examples of the hydrogenated rosin ester include products such as Superester A75, A100, A115, and A125 (each provided by Arakawa Chemical Industries Co., Ltd., and having a softening point of 70° C. to 130° C.).

Examples of the alkylphenol resin include products such as Tamanol 510 (provided by Arakawa Chemical Industries Co., Ltd., and having a softening point of 75° C. to 95° C.). Examples of the DCPD include products such as Escorez 5300 (provided by Tonex Co., Ltd., and having a softening point of 105° C.).

For the tackifier, a fully hydrogenated petroleum resin of the C9 petroleum resins is well compatible with the SIB, and can improve adhesive property without decreasing the gas barrier property. Further, it has an effect of decreasing viscosity, and therefore can be used advantageously for film extrusion molding.

The tackifier is blended in a range of 0.1 part by mass to 100 parts by mass, preferably, 1 part by mass to 50 parts by mass relative to 100 parts by mass of the elastomer component. If the tackifier is blended by less than 0.1 part by mass, vulcanization adhesion strength with the carcass ply will be insufficient. On the other hand, if the tackifier is blended by more than 100 parts by mass, the tackiness will become too high, with the result that workability and productivity are decreased and the gas barrier property is also decreased.

A second layer can further be stacked on the polymer sheet used for the inner liner of the present invention to obtain a composite layer. For the polymer sheet, a general method for forming thermoplastic resin or thermoplastic elastomer into a film, such as extrusion molding or calender molding, can be adopted. It is noted that the thickness of the inner liner is desirably adjusted to fall within a range of 0.05 mm to 0.6 mm.

<Method for Manufacturing Pneumatic Tire>

For the pneumatic tire of the present invention, a general manufacturing method can be used. The pneumatic tire can be manufactured by applying the polymer sheet to the inner liner of a raw tire and molding them through vulcanization together with other members. When disposing the polymer sheet in the raw tire, the polymer sheet is arranged toward the outer side in the tire radial direction so as to be in contact with a carcass ply. With such arrangement, adhesive strength between the polymer sheet and the carcass ply can be increased in the step of vulcanizing the tire. In the resulting pneumatic tire, the inner liner and the rubber layer of the carcass ply are adhered to each other in an excellent manner. Thus, the pneumatic tire can have excellent air permeability resistance and durability. It is noted that, since the polymer sheet containing the SIBS modified copolymer is in a softened and fluid state in the vulcanization step, problems may arise in deformation or sticking to an adjacent member after vulcanization. Therefore, it is desirable to cool the atmosphere in the bladder after vulcanization for 10 seconds to 300 seconds to quench the bladder at 50° C. to 120° C.

It should be noted that in order to adjust the thickness of the inner liner in bead region Rb and buttress region Rs, a profile is provided at an extrusion opening for the polymer sheet, whereby a sheet in which thickness Gs in the buttress region is made thin is obtained in one piece, and this is disposed on the tire inner surface as the inner liner, for example.

The blending of the rubber layer of the carcass ply used for the pneumatic tire of the present invention can be such that a generally used rubber component, such as a natural rubber, polyisoprene, a styrene-butadiene rubber, or a polybutadiene rubber, is blended with a filler such as carbon black or silica.

Third Embodiment

<Pneumatic Tire>

In the present embodiment, the structure of a pneumatic tire can be similar to that of the first embodiment.

In order to effectively relax stress caused by flection deformation, the ratio (Gs/Gb) between average thickness Gs in buttress region Rs and average thickness Gb in bead region Rb of the above-described inner liner is less than 1, preferably 0.5 to 0.7. In order to attain both the effects of maintaining the air pressure retaining performance and relaxing stress in the buttress region, average thickness Gs in buttress region Rs of the above-described inner liner is desirably 0.05 mm to 0.40 mm.

<Inner Liner>

The present invention provides a pneumatic tire including an inner liner disposed on the inner side of the tire, wherein the inner liner is formed of a polymer layer stack of at least two layers. A first layer is an elastomer composition containing a styrene-isobutylene-styrene triblock copolymer (SIBS) as a main component, and a second layer is an elastomer composition containing at least one of a styrene-isoprene-styrene triblock copolymer (SIS) and a styrene-isobutylene diblock copolymer (SIB) as a main component.

As the elastomer components of the first layer and the second layer, a styrene-isobutylene-styrene block copolymer (hereinafter also referred to as a "SIBS modified copolymer") obtained by modifying a styrene block portion of the SIBS with acid chloride or acid anhydride having an unsaturated bond can be contained. The elastomer compositions of the first layer and the second layer contain an ultraviolet absorber and an antioxidant.

<Elastomer Component of First Layer>

In the present invention, the first layer contains a styrene-isobutylene-styrene block copolymer (hereinafter also referred to as "SIBS") as an elastomer component. Since the SIBS contains an isobutylene block in the molecular chain, a polymer film thereof has excellent air permeability resistance. Therefore, when the SIBS is used for the inner liner, a pneumatic tire excellent in air permeability resistance can be obtained. Furthermore, since the molecular structure of the SIBS is saturated except the aromatic unit, oxidation degradation is suppressed.

As to the molecular weight of the SIBS, the SIBS preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be decreased. On the other hand, when the weight average molecular weight thereof exceeds 400,000, extrusion workability may become bad. In order to further improve air permeability resistance and durability, the SIBS preferably contains the styrene component at a content of 10 percent by mass to 30 percent by mass.

In each block in the molecular chain of the SIBS, the isobutylene unit preferably has a degree of polymerization of approximately 10,000 to 150,000, and the styrene unit preferably has a degree of polymerization of approximately 5,000 to 30,000. The SIBS can be produced through a general living cationic polymerization method for a vinyl-based compound. For example, each of Japanese Patent Laying-Open No. 62-48704 and Japanese Patent Laying-Open No. 64-62308 discloses living cationic polymerization of isobutylene and another vinyl compound.

<Elastomer Component of Second Layer>

The second layer is an elastomer composition containing at least one of a styrene-isoprene-styrene block copolymer (hereinafter, also referred to as "SIS") and a styrene-isobutylene block copolymer (hereinafter, also referred to as "SIB").

The isoprene block of the styrene-isoprene-styrene copolymer (SIS) is a soft segment. Hence, a polymer film made of the SIS is likely to adhere to a rubber component through vulcanization. Therefore, when the polymer film made of the SIS is used for the inner liner, a pneumatic tire excellent in durability can be obtained because that inner liner is excellent in adhesive property with the rubber layer of the carcass ply, for example.

The molecular weight of the SIS is not particularly limited, but the SIS preferably has a weight average molecular weight of 100,000 to 290,000 measured through GPC measurement, in view of rubber elasticity and moldability. When the weight average molecular weight thereof is less than 100,000, tensile strength may be unfavorably decreased. On the other hand, when the weight average molecular weight thereof exceeds 290,000, extrusion workability unfavorably becomes bad. The SIS preferably contains the styrene component at a content of 10 percent by mass to 30 percent by mass in view of tackiness, adhesive property, and rubber elasticity.

In the present invention, it is preferable that in the SIS, the isoprene block has a degree of polymerization of approximately 500 to 5,000 and the styrene block has a degree of polymerization of approximately 50 to 1,500 in view of rubber elasticity and handling.

The SIS can be obtained through a general polymerization method for a vinyl-based compound, such as the living cationic polymerization method. The SIS layer can be obtained by forming the SIS into the form of a film by means of a general method for forming thermoplastic resin or thermoplastic elastomer into a film, such as extrusion molding or calender molding.

The isobutylene block of the styrene-isobutylene block copolymer (SIB) is a soft segment. Hence, a polymer film made of the SIB is likely to adhere to a rubber component through vulcanization. Therefore, when a polymer film made of the SIB is used for the inner liner, a pneumatic tire excellent in durability can be obtained because that inner liner is excellent in adhesive property with an adjacent rubber forming the carcass or the insulation, for example.

For the SIB, a linear SIB is preferably used in view of rubber elasticity and adhesive property. The molecular weight of the SIB is not particularly limited, but the SIB preferably has a weight average molecular weight of 40,000 to 120,000 measured through GPC measurement, in view of rubber elasticity and moldability. When the weight average molecular weight thereof is less than 40,000, tensile strength may be unfavorably decreased. On the other hand, when the weight average molecular weight thereof exceeds 120,000, extrusion workability may unfavorably become bad. The SIB preferably contains the styrene component at a content of 10 percent by mass to 35 percent by mass, in view of tackiness, adhesive property, and rubber elasticity. In the present invention, it is preferable that in the SIB, the isobutylene block has a degree of polymerization of approximately 300 to 3,000 and the styrene block has a degree of polymerization of approximately 10 to 1,500 in view of rubber elasticity and handling.

The SIB can be obtained through a general living polymerization method for a vinyl-based compound. For example, the SIB can be obtained by adding methylcyclohexane, n-butyl chloride, and cumyl chloride into an agitator, cooling them to −70° C., reacting them for 2 hours, then adding a large amount of methanol to stop the reaction, and performing vacuum-drying at 60° C.

(Mixture with SIBS)

The second layer can be composed of a mixture of the SIS and the SIBS or a mixture of the SIB and the SIBS. In this case, the mixing amount of the SIBS is adjusted to fall within a range of 10 percent by mass to 80 percent by mass of the thermoplastic elastomer component. If the SIBS is less than 10 percent by mass, adhesive property with the first layer is likely to be decreased. If the SIBS exceeds 80 percent by mass, adhesive property with the carcass ply is likely to be decreased.

<Elastomer Component of First Layer and Second Layer>

(SIBS Modified Copolymer)

The elastomer composition of the first layer can contain the SIBS modified copolymer by 10 percent by mass to 100 percent by mass of the elastomer component. The elastomer composition of the second layer can contain the SIBS modified copolymer by 5 percent by mass to 80 percent by mass, preferably 10 percent by mass to 80 percent by mass of the elastomer component. If the SIBS modified copolymer is less than 5 percent by mass, vulcanization adhesion strength between the first layer and the second layer or between the second layer and the carcass ply may be decreased. If the SIBS modified copolymer exceeds 80 percent by mass, adhesion strength with the carcass ply may be decreased.

Here, the SIBS modified copolymer is obtained by modifying the styrene block moiety of the styrene-isobutylene-styrene block copolymer (SIBS) with acid chloride or acid anhydride having an unsaturated bond, and contains a chemical constitution expressed by Formula (1) below in the molecular chain.

[Formula 2]

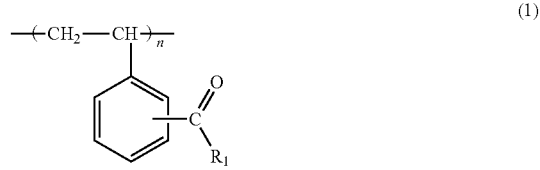

(1)

In Formula (1), n is an integer, and R1 is a monovalent organic group having a functional group.

Examples of acid chloride having an unsaturated bond used for modification in the present invention include methacrylic acid chloride, methacrylic acid bromide, methacrylic acid iodide, acrylic acid chloride, acrylic acid bromide, acrylic acid iodide, crotonic acid chloride, and crotonic acid bromide. In particular, methacrylic acid chloride and acrylic acid chloride are suitable. Examples of acid anhydride include acetic anhydride, maleic anhydride, and phthalic anhydride. Acetic anhydride is particularly suitable. Through such modification, the unsaturated group is introduced into the SIBS, which enables crosslinking of the molecular chain by a cross linking agent.

As described above, the blending amount of the SIBS modified copolymer obtained by modifying the styrene-isobutylene-styrene block copolymer with acid chloride and acid anhydride having an unsaturated bond ranges from 10 percent by mass to 100 percent by mass, preferably 30 percent by mass to 100 percent by mass of a thermoplastic elastomer component. If the blending amount of the SIBS modified copolymer is less than 10 percent by mass of the thermoplastic elastomer component, vulcanization adhesion between the second layer and the carcass ply rubber may be insufficient.

The SIBS modified copolymer contains acid chloride and acid anhydride having an unsaturated bond at a content of more than or equal to 1 percent by weight, preferably more than or equal to 5 percent by weight, and less than or equal to 30 percent by weight.

It is noted that, for the SIBS modified copolymer, thermal crosslinking or crosslinking by a cross linking agent can be performed by a conventional method.

Because of the isobutylene block in the SIBS modified copolymer, a film made of the SIBS modified copolymer has excellent air permeability resistance. Moreover, in the SIBS modified copolymer, the unsaturated group is introduced into the SIBS. Thus, thermal crosslinking and crosslinking by a cross linking agent are made possible, and flection crack characteristics and air permeability resistance are improved together with basic characteristics such as tensile strength, break elongation and permanent strain. The characteristics as the inner liner are thus improved.

The molecular weight of the SIBS modified copolymer is not particularly limited, but the SIBS modified copolymer preferably has a weight average molecular weight of 50,000 to 400,000 measured through GPC measurement, in view of flowability, shaping step, rubber elasticity, and the like. If the weight average molecular weight thereof is less than 50,000, tensile strength and tensile elongation may be unfavorably decreased. On the other hand, if the weight average molecular weight thereof exceeds 400,000, extrusion workability may unfavorably become bad. In order to further improve air permeability resistance and durability, the SIBS modified copolymer preferably contains the styrene component at a content of 10 percent by mass to 30 percent by mass, preferably 14 percent by mass to 23 percent by mass.

In the copolymer of the SIBS, the isobutylene block preferably has a degree of polymerization of approximately 10,000 to 150,000, and the styrene block preferably has a degree of polymerization of approximately 5,000 to 30,000, in view of rubber elasticity and handling (when the degree of polymerization is less than 10,000, each block will be in a liquid form).

As a method for producing the SIBS modified copolymer, the following method can be adopted, for example. The styrene-isobutylene-styrene block copolymer is input into a separable flask, and then the atmosphere in a polymerization container is substituted by nitrogen. Then, an organic solvent (e.g., n-hexane and butyl chloride) having been dried with molecular sieves is added, and methacrylic acid chloride is further added. At last, aluminum trichloride is added while stirring the solution to produce a reaction. A predetermined amount of water is added to the reaction solution after a certain period of time since the start of reaction, and the solution is stirred. The reaction is then terminated. The reaction solution is washed several times or more with a large amount of water, and further, slowly dropped into a large amount of a methanol-acetone mixed solvent to precipitate a polymer. The resulting polymer is vacuum dried. It is noted that the method of producing the SIBS modified copolymer is disclosed in Japanese Patent No. 4551005, for example.

(Styrene-Based Thermoplastic Elastomer)

The first layer and the second layer can each contain a styrene-based thermoplastic elastomer. Here, the styrene-based thermoplastic elastomer refers to a copolymer including a styrene block as a hard segment. In addition to the above-described SIBS, SIS and SIB, examples thereof include: a styrene-butadiene-styrene block copolymer ("SBS"); a styrene-isobutylene-styrene block copolymer ("SIBS"); a styrene-ethylene butene-styrene block copolymer ("SEBS"); a styrene-ethylene propylene-styrene block copolymer ("SEPS"); a styrene-ethylene ethylene propylene-styrene block copolymer ("SEEPS"); and a styrene-butadiene butylene-styrene block copolymer ("SBBS").

Further, the styrene-based thermoplastic elastomer may have an epoxy group in its molecular structure. A usable example thereof is Epofriend A1020 provided by Daicel Chemical Industries Ltd., i.e., an epoxy modified styrene-butadiene-styrene copolymer (epoxidized SBS) (having a weight average molecular weight of 100,000 and an epoxy equivalent of 500).

(Rubber Component)

A rubber component can be blended into the thermoplastic elastomer composition of the first layer. By blending the rubber component, tackiness with an adjacent carcass ply in an unvulcanized state can be provided, and vulcanization adhesive property with the carcass ply or the insulation can be increased through vulcanization.

As the rubber component, at least one selected from the group consisting of a natural rubber, an isoprene rubber, a chloroprene rubber, and a butyl rubber is preferably contained. The blending amount of the rubber component preferably ranges from 5 percent by mass to 75 percent by mass of the elastomer component.

<Ultraviolet Absorber>

In the present invention, an ultraviolet absorber is blended into the elastomer composition. The ultraviolet absorber absorbs light in an ultraviolet range of wavelength of more than or equal to 290 nm to prevent degradation of the molecular chain of the polymer compound. For example, benzophenone-based, salicylate-based, and benzotriazol-based ultraviolet absorbers absorb ultraviolet light of wavelength around 320 nm to 350 nm where a polymer compound is most likely to suffer from degradation. The absorbers have the function of converting light in this wavelength range into vibrational energy or thermal energy, thereby preventing such light to be absorbed into the polymer compound. In particular, the benzotriazol-based ultraviolet absorber can absorb a wide range of ultraviolet light. Here, examples of the ultraviolet absorber are listed below.

[Benzotriazol-Based Ultraviolet Absorber]

TINUVIN P/FL (provided by BASF, and having a molecular weight of 225, a melting point of 128° C. to 132° C., and a maximum absorption wavelength of 341 nm) (2-(2-hydroxy-benzotriazol-2-yl)-p-cresol), TINUVIN 234 (provided by BASF, and having a molecular weight of 447.6, a melting point of 137° C. to 141° C., and a maximum absorption wavelength of 343 nm) (2-[2-hydroxy-3,5-bis(α, α' dimethylbenzyl)phenyl]-2H-benzotriazol), TINUVIN 326/FL (provided by BASF, and having a molecular weight of 315.8, a melting point of 138° C. to 141° C., and a maximum absorption wavelength of 353 nm), ADK STAB LA-36 (provided by ADEKA Corporation) (2-(2'-hydroxy-3'-tert-butyl-5'-methylphenyl)-5-chlorobenzotriazol), TINUVIN 237 (provided by BASF, and having a molecular weight of 338.4, a melting point of 139° C. to 144° C., and a maximum absorption wavelength of 359 nm) (2,4-di-t-butyl-6-(5-chlorobenzotriazol-2-yl-)phenol), TINUVIN 328 (provided by BASF, and having a molecular weight of 351.5, a melting point of 80° C. to 88° C., and a maximum absorption wavelength of 347 nm) (2-(3,5-di-t-amyl-2-hydroxyphenyl)benzotriazol), and TINUVIN 329/FL (provided by BASF, and having a molecular weight of 323, a melting point of 103° C. to 105° C., and a maximum absorption wavelength of 343 nm) (2-(2-hydroxy-benzotriazol-2-yl)-4-tert-octylphenol).

[Liquid Ultraviolet Absorber]

TINUVIN 213 (provided by BASF, and having a melting point of −40° C. and a maximum absorption wavelength of 344 nm) (5-(2-hydroxy-benzotriazol-2-yl)-4-hydroxy-3-tert-butylbenzenpropanoic acid methyl), TINUVIN 571 (provided by BASF, and having a molecular weight of 393.6, a melting point of −56° C. and a maximum absorption wavelength of 343 nm) (2-(2-hydroxybenzotriazol-2-yl)-4-methyl-6-dodecylphenol).

[Triazine-Based Ultraviolet Absorber]

TINUVIN 1577FF (provided by BASF, and having a molecular weight of 425, a melting point of 148° C. and a maximum absorption wavelength of 274 nm) (2-[4,6-diphenyl-1,3,5-triazine-2-yl]-5-(hexyloxy)phenol).

[Benzophenone-Based Ultraviolet Absorber]

CHIMASSORB 81/FL (provided by BASF, and having a molecular weight of 326.4 and a melting point of 48° C. to 49° C.) (2-hydroxy-4-(octyloxy)benzophenone).

[Benzoate-Based Ultraviolet Absorber]

TINUVIN 120 (provided by BASF, and having a molecular weight of 438.7, a melting point of 192° C. to 197° C., and a maximum absorption wavelength of 265 nm) (2,4-di-tert-butylphenyl-3,5-di-tert-butyl-4-hydroxybenzoate).

[Hindered Amine Stabilizer]

CHIMASSORB 2020 FDL (provided by BASF, and having a molecular weight of 2600 to 3400 and a melting point of 130° C. to 136° C.) (polycondensate of dibutylamine 1,3,5-triazine N,N-bis(2,2,6,6-tetramethyl-4-piperidyl-1,6-hexamethylenediamine N-(2,2,6,6-tetramethyl-4-piperidyl) butylamine), CHIMASSORB 944 FDL (provided by BASF, and having a molecular weight of 2000 to 3100 and a melting point of 100° C. to 135° C.) (poly [{6-(1,1,3,3-tetramethylbutyl)amino-1,3,5-triazine-2,4-diyl} {(2,2,6,6-tetramethyl-4-piperidyl)imino}hexamethylene {2,2,6,6-tetramethyl-4-piperidyl)imino}]), TINUVIN 622 LD (provided by BASF, and having a molecular weight of 3100 to 4000 and a melting point of 55° C. to 70° C.) (butanedioic acid 1-[2-(4-hydroxy-2,2,6,6-tetramethyl-piperidino) ethyl]), TINUVIN 144 (provided by BASF, and having a molecular weight of 685 and a melting point of 146° C. to 150° C.) (2-butyl-2-[3,5-di(tert-butyl)-4-hydroxybenzyl] malonic acid bis(1,2,2,6,6-pentamethyl-4-piperidyl), TINUVIN 292 (provided by BASF, and having a molecular weight of 509) (sebacic acid bis(1,2,2,6,6-pentamethyl-4-piperidinyl), and TINUVIN 770 DF (provided by BASF, and having a molecular weight of 481 and a melting point of 81° C. to 85° C.) (sebacic acid bis(2,2,6,6-tetramethylpiperidine-4-yl).

<Antioxidant>

In the present invention, an antioxidant is blended into the elastomer composition. The antioxidant can function as a radical supplementary agent to mainly supplement a carbon radical, thereby preventing degradation of the molecular chain of a polymer. Examples of the antioxidant are listed below.

[Hindered Phenolic Antioxidant]

IRGANOX1010 (provided by BASF), ADK STAB AO-60 (provided by ADEKA Corporation), SUMILIZER BP-101 (provided by Sumitomo Chemical Co., Ltd.) (pentaerythrityl tetrakis[3-(3,5-di-t-butyl-4-hydroxyphenyl) propionate]), IRGANOX1035 (provided by BASF) (2,2-thiodiethylenebis [(3-(3,5-di-t-butyl-4-hydroxyphenyl) propionate)]), IRGANOX1076 (provided by BASF) (octadecyl-3-(3,5-di-t-butyl-4-hydroxyphenyl) propionate), IRGANOX1098 (provided by BASF) (N,N'-hexamethylenebis(3,5-di-t-butyl-4-hydroxy-hydrocinnamamide), IRGANOX1135 (provided by BASF) (isooctyl-3-(3,5-di-t-butyl-4-hydroxyphenyl) propionate]), IRGANOX1330 (provided by BASF) (1,3,5-trimethyl-2,4,6-tris(3,5-di-t-butyl-4-hydroxybenzyl)benzene), IRGANOX1726 (provided by BASF) (4,6-bis(dodecylthiomethyl)-O-cresol), IRGANOX1425 (provided by BASF) (bis(3,5-di-t-butyl-4-hydroxybenzylphosphonic acid ethyl) calcium (50%), polyethylene wax (50%)), IRGANOX1520 (provided by BASF) (2,4-bis[(octylthio)methyl]-O-cresol), IRGANOX245 (provided by BASF) (triethyleneglycol-bis[(3-(3-t-butyl-5-methyl-4-hydroxyphenyl) propionate)]), IRGANOX259 (provided by BASF) (1,6-hexanediol-bis[(3-(3,5-di-t-butyl-4-hydroxyphenyl) propionate]), IRGANOX3114 (provided by BASF) (tris-(3,5-di-t-butyl-4-hydroxybenzyl)-isocyanurate), IRGANOX5057 (provided by BASF) (octylated diphenylamine), IRGANOX565 (provided by BASF) (2,4-bis-(n-octylthio)-6-(4-hydroxy-3,5-di-t-butylanilino)-1,3,5-triazine), Cyanox CY1790 (provided by Sun Chemical Company Ltd.) (1,3,5-tris(4-t-butyl-3-hydroxy-2,6-dimethylbenzyl) isocyanuric acid), ADK STAB AO-40 (provided by ADEKA Corporation), SUMILIZER BBM (provided by Sumitomo Chemical Co., Ltd.) (4,4'-butylidenebis(3-methyl-6-t-butylphenol), ADK STAB AO-50 (provided by ADEKA Corporation), SUMILIZER BP-76 (provided by Sumitomo Chemical Co., Ltd.) (stearyl-β-(3,5-di-t-butyl-4-hydroxyphenyl) propionate), ADK STAB AO-80 (provided by ADEKA Corporation), and SUMILIZER GA-80 (provided by Sumitomo Chemical Co., Ltd.) (3,9-bis[1,1-dimethyl-2-[β-(3-t-butyl-4-hydroxy-5-methylphenyl) propionyloxy]ethyl] 2,4,8,10-tetraoxaspiro[5,5]-undecane).

[Phosphorus-Based Antioxidant]

A phosphorus-based antioxidant is used as a peroxide decomposition agent, and has an excellent antioxidant function in thermal processing molding. Examples thereof are listed below.

IRGAFOS12 (provided by BASF, and having a molecular weight of 1462.9) (6,6',6"-[nitrilotris (ethyleneoxy)]tris(2,4,8,10-tetra-tert-butylbenzo [d, f][1, 3, 2] dioxaphosphepin)), IRGAFOS38 (provided by BASF, and having a molecular weight of 514) (phosphorous acid ethylbis (2,4-di-tert-butyl-6-methylphenyl)), IRGAFOS168 (provided by BASF, and having a molecular weight of 646), ADK STAB 2112 (provided by ADEKA Corporation), SUMILIZER P-16 (provided by Sumitomo Chemical Co., Ltd.) (tris(2,4-di-t-butylphenyl) phosphite), ADK STAB PEP-8 (provided by ADEKA Corporation) (distearyl pentaerythritol diphosphite), and ADK STAB PEP-36 (provided by ADEKA Corporation) (cyclic neopentanetetraylbis(2,6-di-t-butyl-4-methylphenyl) phosphite).

[Hydroxylamine-Based]

IRGASTAB FS 042 (provided by BASF) (N,N-dioctadecylhydroxylamine).

[Hindered Phenol/Phosphorus Mixture-Based Antioxidant]

IRGANOX B 225 (provided by BASF) (IRGAFOS168: IRGANOX1010=1:1), IRGANOX215 (provided by BASF) (IRGAFOS168: IRGANOX1010=2:1), IRGANOX220 (provided by BASF) (IRGAFOS168: IRGANOX1010=3:1), and IRGANOX921 (provided by BASF) (IRGAFOS168: IRGANOX1076=2:1).

[Oxygen Absorber]

In the present invention, the antioxidant is a concept covering an oxygen absorber. As the oxygen absorber, a typical oxygen absorber having a capacity to capture oxygen in the air can be used. Examples thereof can include an iron powder oxygen absorber that absorbs oxygen in the air by way of oxidizing reaction of iron powder. Common use is a combination of 0.1 part by weight to 50 parts by weight of halogenated metal, for example, alkali metal such as sodium chloride, sodium bromide, calcium chloride, and magnesium chloride, or a halide such as chloride, bromide and iodide of alkaline earth metal with 100 parts by weight of iron powder having a surface area of more than or equal to 0.5 m$^2$/g. This may be a mixture thereof or may be obtained by coating the surface of iron powder with halogenated metal. It is noted that porous particles, such as zeolite, impregnated with water content can be further combined into the oxygen absorber used in the present invention to further promote the aforementioned oxidation of iron by oxygen. In particular, a hindered phenolic antioxidant is preferable as a radical trap agent for a carbon radical.

In the present invention, at least one the above-mentioned ultraviolet absorbers and antioxidants can be used, or two or more of them can be used in combination. In particular, it is preferable to use a benzotriazol-based ultraviolet absorber and a hindered phenolic antioxidant in combination.

<Tackifier>

In the present invention, in at least one of the first layer and the second layer, the tackifier is blended by 0.1 part by mass to 100 parts by mass, preferably 1.0 part by mass to 20 parts by mass relative to 100 mass of the thermoplastic elastomer component. Here, the tackifier refers to a compounding agent for increasing tackiness of the thermoplastic elastomer composition. Examples of such a tackifier are illustrated below.

In the case of the first layer, it is necessary to maintain workability, productivity and gas barrier property while increasing vulcanization adhesion with the second layer. On the other hand, in the case of the second layer, it is arranged between the first layer and the carcass ply to improve adhesive property with both of them and to maintain workability, productivity and gas barrier property.

In the present embodiment, a tackifier similar to that of the second embodiment can be used.

<Inner Liner>

(Polymer Layer Stack)

In the present invention, the inner liner employs the polymer layer stack formed of the first layer and the second layer. Here, the first layer and the second layer are elastomer compositions containing thermoplastic elastomer, and are in a softened state in a mold at a vulcanizing temperature of, for example, 150° C. to 180° C. The softened state refers to an intermediate state between solid and liquid with improved molecular mobility. When in the softened state, the thermoplastic elastomer compositions have improved reactivity as compared with the solid state, and therefore stick or adhere to the adjacent component. Therefore, it is preferable to provide a cooling step when manufacturing a tire in order to prevent change in shape of the thermoplastic elastomer compositions, adhesion and welding to the adjacent member. In the cooling step, after the tire vulcanization, quenching is performed for 10 seconds to 300 seconds to 50° C. to 120° C., so that the atmosphere in the bladder can be cooled. As a coolant, one or more of coolants selected from air, water vapor, water, and oil are used. The inner liner can be formed thin by adopting such cooling step.

(Thickness of First Layer and Second Layer)

The thickness (Gs) in buttress region Rs of the inner liner shown in FIG. 1 is preferably made as thin as possible in a range that does not inhibit air permeability resistance, and is preferably set to fall within a range of 0.05 mm to 0.3 mm.

The entire first layer preferably has an average thickness of 0.05 mm to 0.3 mm. If the average thickness of the first layer is less than 0.05 mm, the first layer may be broken due to pressing pressure when vulcanizing the raw tire in which the polymer layer stack formed of the first and second layers is applied to the inner liner, with the result that an air leakage phenomenon may take place in the resulting tire. On the other hand, if the average thickness of the first layer exceeds 0.3 mm, the weight of the tire is increased to result in decreased performance in fuel efficiency. The average thickness of the first layer more preferably ranges from 0.05 mm to 0.15 mm. By adjusting the average thickness of the first layer to fall within the above-mentioned range, flection durability of the buttress region can be improved while maintaining air permeability resistance.

The second layer preferably has an average thickness of 0.01 mm to 0.3 mm. If the average thickness of the second layer is less than 0.01 mm, the second layer may be broken due to pressing pressure when vulcanizing the raw tire in which the polymer layer stack is applied to the inner liner, with the result that vulcanization adhesion strength may be decreased. On the other hand, if the average thickness of the second layer exceeds 0.3 mm, the weight of the tire is increased to possibly result in decreased performance in fuel efficiency. Further, the second layer more preferably has a thickness of 0.05 mm to 0.15 mm.

Figure 2:
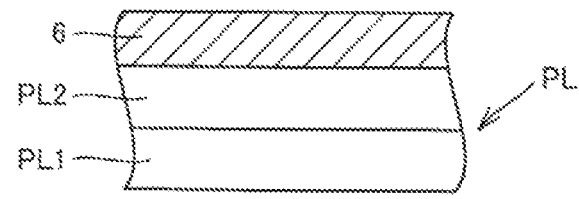
FIG. 2 is a schematic cross sectional view showing a bonding state of an inner liner and a carcass.

FIG. 2 shows an arrangement state of the inner liner with respect to the carcass ply in the vulcanized tire. In FIG. 2, a polymer layer stack PL is composed of a first layer PL1 and a second layer PL2. When applying polymer layer stack PL to the inner liner of the pneumatic tire and disposing second layer PL2 on the outer side in the tire radial direction so as to be in contact with carcass ply 6, adhesive strength between second layer PL2 and carcass 6 can be increased in the step of vulcanizing the tire. In the resulting pneumatic tire, the inner liner and carcass ply 6 are adhered to each other in an excellent manner. Thus, the pneumatic tire has excellent air permeability resistance and durability.

<Method for Manufacturing Pneumatic Tire>

The pneumatic tire of the present invention can be manufactured using a general manufacturing method. First, polymer layer stack PL described above is used to manufacture the inner liner. Pneumatic tire 1 can be manufactured by applying the above-described inner liner to a raw tire and molding them through vulcanization together with other members. When disposing polymer layer stack PL in the raw tire, second layer PL2 is disposed on the outer side in the tire radial direction so as to be in contact with carcass ply 6.

Example 1

The present invention will be described according to an Example.

<Isobutylene-Based Modified Copolymer>

(1) Component A-1: (styrene/β-pinene)-isobutylene-(styrene/β-pinene) block copolymer (having a β-pinene content of 9.7 percent by mass and a number average molecular weight (Mn) of 103,000).

The method for producing component A-1 is as follows.

After the atmosphere in a 2-liter separable flask container was substituted by nitrogen, 31.0 mL of n-hexane dried with molecular sieves and 294.6 mL of butyl chloride similarly dried were added using a syringe. After immersing the polymerization container in a −70° C. mixture bath of dry ice and methanol for cooling, a deliver tube made of Teflon (registered trademark) was connected to a pressure-resistant glass liquefaction collection tube with a three-way stop cock containing 88.9 mL (941.6 mmol) of isobutylene monomer, and isobutylene monomer was delivered by nitrogen pressure into the polymerization container. Then, 0.148 g (0.6 mmol) of p-dicumyl chloride and 0.07 g (0.8 mmol) of α-picoline were added. Furthermore, 0.87 mL (7.9 mmol) of titanium tetrachloride was to start polymerization. After 1.5 hours since the start of polymerization, stirring was performed at a similar temperature, and then 1 mL of a polymerization solution was extracted from the polymerization solution as a sample. Then, after uniformly stirring 10.4 g (99.4 mmol) of styrene monomer and 6.8 g (49.7 mmol) of β-pinene having been cooled to −70° C., they were added to the polymerization container. After 45 minutes since the addition of styrene and β-pinene, about 40 mL of methanol was added to terminate the reaction. After evaporating a solvent and the like from the reaction solution, the reaction solution was dissolved in toluene and washed twice. Then, the toluene solution was added to a large amount of methanol to precipitate a polymer. A resultant product was vacuum dried at 60° C. for 24 hours. The molecular weight of the block copolymer obtained by the GPC method was measured. The number average molecular weight (Mn) thereof is 103,000, and Mw/Mn is 1.21.

(2) Component A-2: (styrene/β-pinene)-isobutylene-(styrene/β-pinene) block copolymer (having a β-pinene content of 5.3 percent by mass and a number average molecular weight of 10,7000).

The method for producing component A-2 is as follows.

After the atmosphere in a 2-liter separable flask container was substituted by nitrogen, 31.0 mL of n-hexane dried with molecular sieves and 294.6 mL of butyl chloride similarly dried were added using a syringe. After immersing the polymerization container in a −70° C. mixture bath of dry ice and methanol for cooling, a deliver tube made of Teflon (registered trademark) was connected to a pressure-resistant glass liquefaction collection tube with a three-way stop cock containing 88.9 mL (941.6 mmol) of isobutylene monomer, and isobutylene monomer was delivered by nitrogen pressure into the polymerization container. Then, 0.148 g (0.6 mmol) of p-dicumyl chloride and 0.07 g (0.8 mmol) of α-picoline were added.

Next, 0.87 mL (7.9 mmol) of titanium tetrachloride was to start polymerization. After 1.5 hours since the start of polymerization, stirring was performed at a similar temperature, and then 1 mL of a polymerization solution was extracted from the polymerization solution as a sample. Then, after uniformly stirring 10.4 g (99.4 mmol) of styrene monomer and 3.6 g (26.3 mmol) of β-pinene having been cooled to −70° C., they were added to the polymerization container. After 45 minutes since the addition of styrene and β-pinene, about 40 mL of methanol was added to terminate the reaction. After evaporating a solvent and the like from the reaction solution, the reaction solution was dissolved in toluene and washed twice. Furthermore, the toluene solution was added to a large amount of methanol to precipitate a polymer. The resultant polymer was vacuum dried at 60° C. for 24 hours. The molecular weight of the block copolymer obtained by the GPC method was measured. The number average molecular weight (Mn) of the block copolymer is 107,000, and Mw/Mn is 1.23.

(3) Component A-3: styrene-(isobutylene/β-pinene)-styrene block copolymer (having a β-pinene content of 5.3 percent by mass and a number average molecular weight of 10,9000).

The method for producing of component A-3 is as follows.

After the atmosphere in a 2-liter separable flask container was substituted by nitrogen, 31.0 mL of n-hexane dried with molecular sieves and 294.6 mL of butyl chloride dried with molecular sieves were added using a syringe. After immersing the polymerization container in a −70° C. mixture bath of dry ice and methanol for cooling, 3.6 g (26.3 mmol) of β-pinene was added.

Then, a deliver tube made of Teflon (registered trademark) was connected to a pressure-resistant glass liquefaction collection tube with a three-way stop cock containing 88.9 mL (941.6 mmol) of isobutylene monomer, and isobutylene monomer was delivered by nitrogen pressure into the polymerization container. Then, 0.148 g (0.6 mmol) of p-dicumyl chloride and 0.07 g (0.8 mmol) of α-picoline were added. Furthermore, 0.87 mL (7.9 mmol) of titanium tetrachloride was to start polymerization. After 45 minutes since the start of polymerization, 10.4 g (99.4 mmol) of styrene monomer having been cooled to −70° C. was added to the polymerization container. After 45 minutes since the addition of styrene, about 40 mL of methanol was added to terminate the reaction. After evaporating a solvent and the like from the reaction solution, the reaction product was dissolved in toluene and washed twice. Furthermore, the toluene solution was added to a large amount of methanol to precipitate a polymer. The resultant polymer was vacuum dried at 60° C. for 24 hours. The molecular weight of a block copolymer obtained by the GPC method was measured. The number average molecular weight (Mn) of the block copolymer is 109,000, and Mw/Mn is 1.21.

<SIBS (Styrene-Isobutylene-Styrene Block Copolymer)>

"SIBSTAR 102T (Shore A hardness: 25; the content of the styrene component: 15 percent by mass; and weight average molecular weight: 100,000)" provided by Kaneka Corporation was used.

<IIR>

"Exxon Chlorobutyl 1066" provided by Exxon Mobil Corporation was used.

<NR>

TSR20 was used for the natural rubber.

<Filler>

Carbon black, "SEAST V" (N660, $N_2SA$: 27 $m^2/g$) provided by Tokai Carbon Co., Ltd. was used for the filler.

<Adjustment of Elastomer Composition>

Thermoplastic elastomer compositions were prepared by blending the above-described elastomer components as indicated in Tables 1 and 2.

TABLE 1

| | | | | Comparative Example 1-1 | Comparative Example 1-2 | Comparative Example 1-3 | Comparative Example 1-4 | Comparative Example 1-5 | Comparative Example 1-6 |
|---|---|---|---|---|---|---|---|---|---|
| Inner Liner | Blending Amount (parts by mass) | Polymer Mixture Component | SIBS | — | 100 | 90 | 90 | 90 | 10 |
| | | | Component A-1 | — | — | 10 | — | — | 90 |
| | | | Component A-2 | — | — | — | 10 | — | — |
| | | | Component A-3 | — | — | — | — | 10 | — |
| | | | IIR | 80 | — | — | — | — | — |
| | | | NR | 20 | — | — | — | — | — |
| | | Filler | | 60 | — | — | — | — | — |
| | Layer Thickness (mm) | IIR/NR/Filler Layer | | 1.00 | — | — | — | — | — |
| | | SIBS Layer | | — | 0.60 | — | — | — | — |
| | | Mixed Layer of SIBS + Component A | | — | — | 0.60 | 0.60 | 0.60 | 0.60 |
| | Gs/Gb Ratio | | | 1.00 | 1.00 | 1.00 | 1.00 | 1.00 | 1.00 |
| | Gs | | (mm) | 1.00 | 0.60 | 0.60 | 0.60 | 0.60 | 0.60 |

TABLE 1-continued

| | | | | | | | | |
|---|---|---|---|---|---|---|---|---|
| Performance Evaluation | Detachment Force | | index | 100 | 60 | 105 | 105 | 102 | 109 |
| | Flection Fatigue Resistance | | index | 100 | 105 | 105 | 105 | 105 | 101 |
| | Static Air Pressure Decreasing Ratio | | (%/month) | 3.2 | 2.5 | 2.5 | 2.5 | 2.5 | 2.7 |
| | Crack Resistance | | index | 100 | 100 | 100 | 100 | 100 | 100 |

| | | | | | Comparative Example 1-7 | Comparative Example 1-8 | Comparative Example 1-9 | Comparative Example 1-10 | Comparative Example 1-11 |
|---|---|---|---|---|---|---|---|---|---|
| Inner Liner | Blending Amount (parts by mass) | Polymer Mixture Component | SIBS | | 10 | 10 | 95 | 5 | 90 |
| | | | Component A-1 | | — | — | 5 | 95 | 10 |
| | | | Component A-2 | | 90 | — | — | — | — |
| | | | Component A-3 | | — | 90 | — | — | — |
| | | | IIR | | — | — | — | — | — |
| | | | NR | | — | — | — | — | — |
| | | Filler | | | — | — | — | — | — |
| | Layer Thickness (mm) | IIR/NR/Filler Layer | | | — | — | — | — | — |
| | | SIBS Layer | | | — | — | — | — | — |
| | | Mixed Layer of SIBS + Component A | | | 0.60 | 0.60 | 0.60 | 0.60 | 0.60 |
| | Gs/Gb Ratio | | | | 1.00 | 1.00 | 0.75 | 0.75 | 0.25 |
| | Gs | | | (mm) | 0.60 | 0.60 | 0.45 | 0.45 | 0.15 |
| Performance Evaluation | Detachment Force | | index | | 106 | 105 | 90 | 105 | 105 |
| | Flection Fatigue Resistance | | index | | 101 | 101 | 104 | 101 | 105 |
| | Static Air Pressure Decreasing Ratio | | (%/month) | | 2.7 | 2.7 | 2.5 | 2.7 | 2.5 |
| | Crack Resistance | | index | | 100 | 100 | 100 | 98 | 95 |

TABLE 2

| | | | | | Example 1-1 | Example 1-2 | Example 1-3 | Example 1-4 | Example 1-5 |
|---|---|---|---|---|---|---|---|---|---|
| Inner Liner | Blending Amount (parts by mass) | Polymer Mixture Component | SIBS | | 90 | 90 | 90 | 10 | 10 |
| | | | Component A-1 | | 10 | — | — | 90 | — |
| | | | Component A-2 | | — | 10 | — | — | 90 |
| | | | Component A-3 | | — | — | 10 | — | — |
| | | | IIR | | — | — | — | — | — |
| | | | NR | | — | — | — | — | — |
| | | Filler | | | — | — | — | — | — |
| | Layer Thickness (mm) | IIR/NR/Filler Layer | | | — | — | — | — | — |
| | | SIBS Layer | | | — | — | — | — | — |
| | | Mixed Layer of SIBS + Component A | | | 0.60 | 0.60 | 0.60 | 0.60 | 0.60 |
| | Gs/Gb Ratio | | | | 0.75 | 0.75 | 0.75 | 0.75 | 0.75 |
| | Gs | | | (mm) | 0.45 | 0.45 | 0.45 | 0.45 | 0.45 |
| Performance Evaluation | Detachment Force | | index | | 105 | 105 | 102 | 109 | 106 |
| | Flection Fatigue Resistance | | index | | 105 | 105 | 105 | 101 | 101 |
| | Static Air Pressure Decreasing Ratio | | (%/month) | | 2.5 | 2.5 | 2.5 | 2.7 | 2.7 |
| | Crack Resistance | | index | | 110 | 110 | 110 | 110 | 110 |

| | | | | | Example 1-6 | Example 1-7 | Example 1-8 | Example 1-9 |
|---|---|---|---|---|---|---|---|---|
| Inner Liner | Blending Amount (parts by mass) | Polymer Mixture Component | SIBS | | 10 | 90 | 90 | 90 |
| | | | Component A-1 | | — | 10 | 10 | 10 |
| | | | Component A-2 | | — | — | — | — |
| | | | Component A-3 | | 90 | — | — | — |
| | | | IIR | | — | — | — | — |
| | | | NR | | — | — | — | — |
| | | Filler | | | — | — | — | — |
| | Layer Thickness (mm) | IIR/NR/Filler Layer | | | — | — | — | — |
| | | SIBS Layer | | | — | — | — | — |
| | | Mixed Layer of SIBS + Component A | | | 0.60 | 0.60 | 0.60 | 0.60 |
| | Gs/Gb Ratio | | | | 0.75 | 0.58 | 0.50 | 0.33 |
| | Gs | | | (mm) | 0.45 | 0.35 | 0.30 | 0.20 |
| Performance Evaluation | Detachment Force | | index | | 105 | 105 | 105 | 105 |
| | Flection Fatigue Resistance | | index | | 101 | 105 | 105 | 105 |
| | Static Air Pressure Decreasing Ratio | | (%/month) | | 2.7 | 2.5 | 2.5 | 2.5 |
| | Crack Resistance | | index | | 110 | 110 | 108 | 104 |

<Method for Manufacturing Inner Liner>

Based on the blends of Tables 1 and 2, an isobutylene-based modified copolymer (component A) and the elastomer component of the SIBS were introduced into a biaxial extruder (screw diameter: φ50 mm; L/D: 30; cylinder temperature: 220° C.) to obtain a pellet of an elastomer composition. Thereafter, a sheet for an inner liner was fabricated using a T-die extruder (screw diameter: φ80 mm; L/D: 50; die gap width: 500 mm; cylinder temperature: 220° C.).

<Manufacturing of Pneumatic Tire>

A raw tire was prepared using the sheet for an inner liner obtained by the above-described method. Then, in the vulcanization step, the raw tire was press molded at 170° C. for 20 minutes. After vulcanization of the tire, the tire was cooled for 3 minutes at 100° C., and the vulcanized tire was removed from the mold. A pneumatic tire with a size of 195/65R15 having the basic structure shown in FIG. 1 was thus manufactured.

Comparative Examples 1-1 to 1-11

In Tables 1 and 2, the thickness of a mixed layer of SIBS+component A indicates the average thickness of a region other than Gs. Gb was 0.6 mm in each of the Examples and Comparative Examples except Comparative Example 1-1.

For the inner liner of Comparative Example 1-1, the following blending components were mixed with a Banbury mixer, and a sheet was formed therefrom using a calender roll, thereby obtaining a polymer film having a thickness of 1.0 mm. The value of Gs/Gb was 1.

| | |
|---|---|
| IIR (Note 1) | 80 parts by mass |
| NR (Note 2) | 20 parts by mass |
| Filler (Note 3) | 60 parts by mass |

(Note 1)
"Exxon Chlorobutyl 1068" provided by Exxon Mobil Corporation
(Note 2)
TSR20
(Note 3)
"SEAST V" (N660; nitrogen adsorption specific surface area: 27 m²/g) provided by Tokai Carbon Co., Ltd.

In Comparative Example 1-2, the SIBS layer produced by the above-described method and having a thickness of 0.6 mm was used as the inner liner. The value of Gs/Gb was 1. Comparative Examples 1-3 to 1-8 are examples in which an elastomer composition obtained by mixing an isobutylene-based modified copolymer (component A) with the SIBS was used for the inner liner, and the value of Gs/Gb was 1. Comparative Example 1-9 is an example in which component A was mixed by 5 percent by mass with the SIBS. Comparative Example 1-10 is an example in which component A was mixed by 95 percent by mass with the SIBS, and the value of Gs/Gb was 0.75. Comparative Example 1-11 is an example in which component A was mixed with the SIBS, and the value of Gs/Gb was 0.25.

Examples 1-1 to 1-9

Examples 1-1 to 1-6 are examples in which an elastomer composition obtained by mixing an isobutylene-based modified copolymer (component A) with the SIBS was used for the inner liner, and the value of Gs/Gb was 0.75. Examples 1-1 and 1-7 to 1-9 are examples in which an elastomer composition obtained by mixing component A with the SIBS was used for the inner liner, and the value of Gs/Gb were varied. The value of Gs/Gb of Example 1-1 was 0.75, which is the highest, and the value of Gs/Gb of Example 1-9 was 0.33, which is the lowest.

<Performance Test>

For each of the sheets and pneumatic tires of the Examples and Comparative Examples, a performance test was conducted by the following method.

<Detachment Test>

In accordance with JISK-6256 "Rubber, vulcanized or thermoplastic—Determination of adhesion test", a test specimen was prepared and a detachment test was performed. Detachment force between the inner liner and the carcass was measured. The test specimen had a width of 25 mm. The detachment test was performed under a room temperature condition of 23° C. A larger detachment force between the inner liner and the carcass is more preferable.

<Flection Fatigue Resistance Test>

In accordance with JISK-6260 "Rubber, vulcanized or thermoplastic—Determination of flex cracking and crack growth (De Mattia type)", a predetermined test specimen having a groove at its center was fabricated. For the inner liner, a sheet having a thickness of 0.3 mm was adhered to a rubber and was vulcanized, thereby fabricating a predetermined test specimen. The test was performed in the following manner. That is, a cut was provided in advance at the center of the groove of the test specimen, flection deformation was repeatedly given, and crack growth was measured. At an atmospheric temperature of 23° C., a strain of 30%, and a cycle of 5 Hz, the crack length was measured at the 700,000-th cycle, the 1,400,000-th cycle, and the 2,100,000-th cycle. The number of repetitions of flection deformation for 1 mm growth of the crack was calculated. With the value of Comparative Example 1-1 being regarded as a reference (100), the flection fatigue resistance of the polymer layer stack of each of the Examples and Comparative Examples was indicated by an index. It can be said that as the numerical value is larger, the crack is less likely to be grown, which is more favorable. For example, the index of Example 1-1 is obtained from the following equation:

(Flection Fatigue Resistance Index)=(Number of Repetitions of Flection Deformation of Example 1-1)/(Number of Repetitions of Flection Deformation of Comparative Example 1-1)×100

<Static Air Pressure Decreasing Ratio Test>

A 195/65R15 steel radial PC tire produced by the above-described method was assembled to a JIS specification rim 15×6JJ, and air was introduced thereinto at an initial air pressure of 300 Kpa. Then, the tire was left for 90 days at a room temperature, and the air pressure decreasing ratio was calculated.

<Measurement of Average Thickness>

The 195/65R15 steel radial PC tire was equally divided into eight in the circumferential direction. In each of the divided portions, eight cut samples were made by cutting it in the tire radial direction with a width of 20 mm. For each of the eight cut samples, the thickness of the inner liner was measured at five points with an equal interval in each of buttress region Rs and bead region Rb. Arithmetic mean values of the measured values at the total of 40 points each were determined as Gs and Gb, respectively.

<Crack Resistance>

The 195/65R15 steel radial PC tire was assembled to the JIS specification rim 15×6JJ, and air was introduced at a proper air pressure. Then, the maximum load corresponding to this air pressure was applied in accordance with the air pressure-loading capability correspondence table of the JATMA YEAR BOOK, and traveling was performed on a drum at a speed of 80 km/h. Then, the traveling was terminated upon occurrence of damage that could be identified by visual observation on the external appearance, and the traveling distance was obtained. The traveling distance is indicated by an index with the traveling distance of Comparative Example 1-1 being regarded as 100. As the index is larger, the crack resistance is more excellent.

<Result of Performance Evaluation>

It can be seen from Tables 1 and 2 that all of Examples 1-1 to 1-9 of the present invention are totally superior to Comparative Examples 1-1 to 1-11 in detachment force, flection fatigue resistance, static air decreasing ratio, and crack resistance.

Example 2

In accordance with the specifications shown in Tables 3 and 4, pneumatic tires of the Examples and Comparative Examples were manufactured and performance was evaluated. The SIBS and the modified SIBS used for the polymer sheet were prepared as follows.

[SIBS]

"SIBSTAR 102T (Shore A hardness: 25; the content of the styrene component: 15 percent by mass; and weight average molecular weight: 100,000)" provided by Kaneka Corporation was used.

[Production of SIBS Modified Copolymer]

Into a 2-liter separable flask, 75 g of a styrene-isobutylene block copolymer (the styrene content: 30%; the number of moles of the styrene unit: 0.216 mol) was input, and the atmosphere in the container was substituted by nitrogen. Using a syringe, 1200 mL of n-hexane dried with molecular sieves and 1800 ml of n-butyl chloride dried with molecular sieves were added.

Next, 30 g (0.291 mol) of methacrylic acid chloride was added using a syringe. Then, 39.4 g (0.295 mol) of aluminum trichloride was added while stirring the solution to start a reaction. After the reaction for 30 minutes, about 1000 ml of water was added to the reaction solution, which was stirred vigorously to terminate the reaction. The reaction solution was washed with a large amount of water several times, and further slowly dropped into a large amount of a methanol-acetone mixed solvent (1:1) to precipitate a reaction product. Then, the reaction product was vacuum dried at 60° C. for 24 hours to obtain an SIBS modified copolymer (weight average molecular weight: 150,000; the styrene content: 20 percent by mass; acid chloride: 1.0 percent by weight).

<Manufacturing of Pneumatic Tire>

The above-described SIBS and modified SIBS were pelletized using a biaxial extruder (screw diameter: ϕ50 mm; L/D: 30; cylinder temperature: 220° C.). Thereafter, the polymer sheet was fabricated using a T-die extruder (screw diameter: ϕ80 mm; L/D: 50; die gap width: 500 mm; cylinder temperature: 220° C.; film gauge: 0.3 mm).

The pneumatic tire was manufactured as follows. That is, the above-described polymer sheet was used for the inner liner, and a raw tire having the basic structure shown in FIG. 1 with the size of 195/65R15 was molded. Then, in the vulcanization step, the raw tire was molded at 170° C. for 20 minutes. Then, in the pneumatic tire, the bladder was cooled to be quenched for 10 seconds to 300 seconds to 50° C. to 120° C. Water was used as a coolant. Here, in order to adjust the thickness of the inner liner in bead region Rb and buttress region Rs, a profile was provided at an extrusion opening for the polymer sheet, whereby a sheet in which thickness Gs in the buttress region was made thin was obtained in one piece. This was disposed on the tire inner surface as the inner liner.

TABLE 3

| | | | | | Comparative Example 2-1 | Comparative Example 2-2 | Comparative Example 2-3 | Comparative Example 2-4 | Comparative Example 2-5 | Comparative Example 2-6 |
|---|---|---|---|---|---|---|---|---|---|---|
| Inner Liner | Blending Amount (parts by mass) | Polymer Mixture Component | SIBS | | — | 100 | 90 | 90 | 50 | 50 |
| | | | SIBS Modified Copolymer | | — | — | 10 | 10 | 50 | 50 |
| | | | Tackifier | | — | — | — | 5 | — | 5 |
| | | | Chlorobutyl | | 80 | — | — | — | — | — |
| | | | NR | | 20 | — | — | — | — | — |
| | | | Filler | | 60 | — | — | — | — | — |
| | Layer Thickness (mm) Gb | IIR/NR/Filler Layer | | | 1.00 | — | — | — | — | — |
| | | SIBS Layer/SIBS Modified Copolymer Layer | | | — | 0.60(*1) | 0.60 | — | 0.60 | — |
| | | SIBS Modified Copolymer/SIBS/Tackifier Mixed Layer | | | — | — | — | 0.60 | — | 0.60 |
| | Gs | | | (mm) | 1.00 | 0.60 | 0.60 | 0.60 | 0.60 | 0.60 |
| | Gs/Gb Ratio | | | (—) | 1.00 | 1.00 | 1.00 | 1.00 | 1.00 | 1.00 |
| Performance Evaluation | Detachment Force | | | index | 100 | 60 | 100 | 103 | 105 | 108 |
| | Flection Fatigue Resistance | | | index | 100 | 105 | 105 | 105 | 105 | 105 |
| | Static Air Pressure Decreasing Ratio | | | (%/month) | 3.2 | 2.5 | 2.5 | 2.5 | 2.6 | 2.6 |
| | Crack Resistance | | | index | 100 | 100 | 100 | 100 | 100 | 100 |

| | | | | | Comparative Example 2-7 | Comparative Example 2-8 | Comparative Example 2-9 | Comparative Example 2-10 | Comparative Example 2-11 |
|---|---|---|---|---|---|---|---|---|---|
| Inner Liner | Blending Amount (parts by mass) | Polymer Mixture Component | SIBS | | — | — | 95 | 95 | 90 |
| | | | SIBS Modified Copolymer | | 100 | 100 | 5 | 5 | 10 |
| | | | Tackifier | | — | 5 | — | 5 | 5 |
| | | | Chlorobutyl | | — | — | — | — | — |
| | | | NR | | — | — | — | — | — |
| | | | Filler | | — | — | — | — | — |

TABLE 3-continued

|  |  |  |  |  |  |  |  |  |
|---|---|---|---|---|---|---|---|---|
| Layer Thickness (mm) | | IIR/NR/Filler Layer | | — | — | — | — | — |
| | | SIBS Layer/SIBS Modified Copolymer Layer | | 0.60(*2) | — | 0.60 | — | — |
| | Gb | SIBS Modified Copolymer/SIBS/Tackifier Mixed Layer | | — | 0.60 | — | 0.60 | 0.60 |
| | Gs | | (mm) | 0.60 | 0.60 | 0.45 | 0.45 | 0.15 |
| | Gs/Gb Ratio | | (—) | 1.00 | 1.00 | 0.75 | 0.75 | 0.25 |
| Performance Evaluation | Detachment Force | | index | 110 | 113 | 80 | 85 | 103 |
| | Flection Fatigue Resistance | | index | 103 | 103 | 104 | 104 | 100 |
| | Static Air Pressure Decreasing Ratio | | (%/month) | 2.6 | 2.6 | 2.5 | 2.5 | 2.5 |
| | Crack Resistance | | index | 100 | 100 | 100 | 100 | 95 |

(*1)Single layer of SIBS
(*2)Single layer of SIBS modified copolymer

TABLE 4

|  |  |  |  |  | Example 2-1 | Example 2-2 | Example 2-3 | Example 2-4 | Example 2-5 |
|---|---|---|---|---|---|---|---|---|---|
| Inner Liner | Blending Amount (parts by mass) | Polymer Mixture Component | SIBS | | 90 | 90 | 50 | 50 | — |
| | | | SIBS Modified Copolymer | | 10 | 10 | 50 | 50 | 100 |
| | | | Tackifier | | 5 | — | 5 | — | 5 |
| | | | Chlorobutyl | | — | — | — | — | — |
| | | | NR | | — | — | — | — | — |
| | | Filler | | | — | — | — | — | — |
| | Layer Thickness (mm) | IIR/NR/Filler Layer | | | — | — | — | — | — |
| | | SIBS Layer/SIBS Modified Copolymer Layer | | | — | 0.60 | — | 0.60 | — |
| | Gb | SIBS Modified Copolymer/SIBS/Tackifier Mixed Layer | | | 0.60 | — | 0.60 | — | 0.60 |
| | Gs | | (mm) | | 0.45 | 0.45 | 0.45 | 0.45 | 0.45 |
| | Gs/Gb Ratio | | (—) | | 0.75 | 0.75 | 0.75 | 0.75 | 0.75 |
| Performance Evaluation | Detachment Force | | index | | 103 | 100 | 108 | 105 | 113 |
| | Flection Fatigue Resistance | | index | | 105 | 105 | 105 | 105 | 103 |
| | Static Air Pressure Decreasing Ratio | | (%/month) | | 2.5 | 2.5 | 2.6 | 2.6 | 2.6 |
| | Crack Resistance | | index | | 110 | 110 | 110 | 110 | 110 |

|  |  |  |  |  | Example 2-6 | Example 2-7 | Example 2-8 | Example 2-9 |
|---|---|---|---|---|---|---|---|---|
| Inner Liner | Blending Amount (parts by mass) | Polymer Mixture Component | SIBS | | — | 90 | 90 | 90 |
| | | | SIBS Modified Copolymer | | 100 | 10 | 10 | 10 |
| | | | Tackifier | | — | 5 | 5 | 5 |
| | | | Chlorobutyl | | — | — | — | — |
| | | | NR | | — | — | — | — |
| | | Filler | | | — | — | — | — |
| | Layer Thickness (mm) | IIR/NR/Filler Layer | | | — | — | — | — |
| | | SIBS Layer/SIBS Modified Copolymer Layer | | | 0.60(*1) | — | — | — |
| | Gb | SIBS Modified Copolymer/SIBS/Tackifier Mixed Layer | | | — | 0.60 | 0.60 | 0.60 |
| | Gs | | (mm) | | 0.45 | 0.35 | 0.30 | 0.20 |
| | Gs/Gb Ratio | | (—) | | 0.75 | 0.58 | 0.50 | 0.33 |
| Performance Evaluation | Detachment Force | | index | | 110 | 103 | 103 | 103 |
| | Flection Fatigue Resistance | | index | | 103 | 105 | 105 | 105 |
| | Static Air Pressure Decreasing Ratio | | (%/month) | | 2.6 | 2.5 | 2.5 | 2.5 |
| | Crack Resistance | | index | | 110 | 110 | 108 | 105 |

(*1)Single layer of SIBS modified copolymer

In each of Tables 3 and 4, the thickness of the inner liner represents the thickness of a region other than Gb. Gb was 0.6 mm in each of the Examples and Comparative Examples except Comparative Example 2-1.

<Rubber Sheet for Carcass Ply>

In the Examples, a topping rubber for the carcass ply was blended as follows.

<Blend A of Topping Rubber>

| Natural rubber (Note 1) | 70 parts by mass |
|---|---|
| Synthetic rubber (SBR1502) | 30 parts by mass |
| Carbon black (Note 2) | 45 parts by mass |
| Zinc oxide | 3 parts by mass |
| Sulfur | 3 parts by mass |
| Vulcanization accelerator (Note 3) | 1 part by mass |
| Vulcanization aid | 1 part by mass |

(Note 1)
TSR20
(Note 2)
"SEAST 3" (N330) provided by Tokai Carbon Co., Ltd.
(Note 3)
"NOCCELER CZ" provided by Ouchi Shinko Chemical

Comparative Example 2-1

For the inner liner of Comparative Example 2-1, the following blending components were mixed with a Banbury mixer, and formed into a sheet with a calender roll, thereby obtaining a polymer film having a thickness of 1.0 mm. The value of Gs/Gb was 1.

| | |
|---|---|
| Chlorobutyl (Note 1) | 80 parts by mass |
| Natural rubber (Note 2) | 20 parts by mass |
| Filler (Note 3) | 60 parts by mass |

(Note 1)
"Exxon Chlorobutyl 1068" provided by Exxon Mobil Corporation
(Note 2)
TSR20
(Note 3)
"SEAST V" (N660; nitrogen adsorption specific surface area: 27 m$^2$/g) provided by Tokai Carbon Co., Ltd.

Comparative Examples 2-2, 2-7

In Comparative Example 2-2, the SIBS was used for the polymer sheet. In Comparative Example 2-7, the modified SIBS was used for the polymer sheet. They had a thickness (Gb) of 0.6 mm. The value of Gs/Gb was 1.

Comparative Examples 2-3 to 2-6, 2-8

A polymer sheet of a mixture of the modified SIBS and the SIBS or a mixture further containing a tackifier having a thickness (Gb) of 0.60 mm was applied to the inner liner. The value of Gs/Gb was 1.

Comparative Examples 2-9 to 2-11

A polymer sheet of a mixture of the modified SIBS and the SIBS or a mixture further containing a tackifier having a thickness (Gb) of 0.60 mm was applied to the inner liner. The value of Gs/Gb was 0.75.

Examples 2-1, 2-3, 2-7 to 2-9

Examples 2-1, 2-3 and 2-7 to 2-9 are examples in which the SIBS, the modified SIBS and a tackifier were mixed into the polymer sheet. In Examples 2-7 to 2-9, the value of Gs/Gb were varied.

Examples 2-2, 2-4, 2-5, 2-6

Examples 2-2 and 2-4 are examples in which the SIBS and the modified SIBS were mixed into the polymer sheet. The value of Gs/Gb was 0.75 in each example.

Examples 2-5 and 2-6 are examples in which the modified SIBS was mixed or the tackifier was further mixed into the polymer sheet. The value of Gs/Gb was 0.75 in each example.

It can be seen that all of the Examples of the present invention are superior to Comparative Example 2-1 in detachment force, flection fatigue resistance, static air pressure decreasing ratio, and crack resistance.

<Performance Test>

The method for the performance test on each of the pneumatic tires of the Examples and Comparative Examples will be described below.

<Detachment Test>

In accordance with JIS-K6256 "Rubber, vulcanized or thermoplastic—Determination of adhesion test", a detachment test was performed to measure detachment force between the inner liner and the carcass (IL/carcass detachment force). The test specimen had a width of 25 mm. The detachment test was performed under a room temperature condition of 23° C. Larger detachment force between the inner liner and the carcass is more preferable.

<Flection Fatigue Resistance Test>

In accordance with JIS-K6260 "Rubber, vulcanized or thermoplastic—Determination of flex cracking and crack growth (De Mattia type)", a predetermined test specimen having a groove at its center was fabricated. For the inner liner, a sheet having a thickness of 0.3 mm was adhered to a rubber and was vulcanized, thereby fabricating a predetermined test specimen. The test was performed in the following manner. That is, a cut was provided in advance at the center of the groove of the test specimen, flection deformation was repeatedly given, and crack growth was measured. At an atmospheric temperature of 23° C., a strain of 30%, and a cycle of 5 Hz, the crack length was measured at the 700000-th cycle, the 1400000-th cycle, and the 2100000-th cycle. The number of repetitions of flection deformation for 1 mm growth of the crack was calculated. With the value of Comparative Example 2-1 being regarded as a reference (100), the flection fatigue resistance of each of the Examples and Comparative Examples was indicated by an index. It can be said that as the numerical value is larger, the crack is less likely to be grown, which is more favorable. For example, the index of Example 2-1 can be obtained by the following equation:

(Flection Fatigue Resistance Index)=(Number of Repetitions of Flection Deformation of Example 2-1)/(Number of Repetitions of Flection Deformation of Comparative Example 2-1)×100

<Static Air Pressure Decreasing Ratio Test>

A 195/65R15 steel radial PC tire was assembled to a JIS specification rim 15×6JJ, and air was introduced thereinto at an initial air pressure of 300 Kpa. Then, the tire was left for 90 days at a room temperature, and the air pressure decreasing ratio was calculated.

<Measurement of Average Thickness>

The 195/65R15 steel radial PC tire was equally divided into eight in the circumferential direction. In each of the divided portions, eight cut samples were made by cutting it in the tire radial direction with a width of 20 mm. For each of the eight cut samples, the thickness of the inner liner was measured at five points with an equal interval in each of buttress region Rs and bead region Rb. Arithmetic mean values of the measured values at the total of 40 points each were determined as Gs and Gb, respectively.

<Crack Resistance>

The 195/65R15 steel radial PC tire was assembled to the JIS specification rim 15×6JJ, and air was introduced at a proper air pressure. Then, the maximum load corresponding to this air pressure was applied in accordance with the air pressure-loading capability correspondence table of the JATMA YEAR BOOK, and traveling was performed on a drum at a speed of 80 km/h. Then, the traveling was terminated upon occurrence of damage that could be identified by visual observation on the external appearance. Then, the traveling distance was obtained. The traveling distance is indicated by an index with the traveling distance of Comparative Example 2-1 being regarded as 100. As the index is larger, the crack resistance is more excellent.

Example 3

<Polymer Layer Stack>

The thermoplastic elastomers (SIB, SIBS, SIS, and SIBS modified copolymer), ultraviolet absorber and antioxidant used for manufacturing the polymer layer stack formed of the first layer and the second layer of the present invention were prepared in the following manner.

[SIB]

Into a 2 L reaction container having an agitator, 589 mL of methylcyclohexane (dried with molecular sieves), 613 ml of n-butyl chloride (dried with molecular sieves), and 0.550 g of cumyl chloride were added. The reaction container was cooled to −70° C., and then 0.35 mL of α-picoline (2-methylpyridine) and 179 mL of isobutylene were added. Further, 9.4 mL of titanium tetrachloride was added to start polymerization. They were reacted with each other for 2.0 hours while stirring the solution at −70° C. Next, 59 mL of styrene was added to the reaction container, and the reaction was continued for another 60 minutes. Then, a large amount of methanol was added to stop the reaction. After removing the solvent and the like from the reaction solution, the polymer was dissolved with toluene and washed with water twice. This toluene solution was added to a methanol mixture to precipitate a polymer. The resultant polymer was dried at 60° C. for 24 hours, thereby obtaining a styrene-isobutylene diblock copolymer (the content of the styrene component: 15 percent by mass; weight average molecular weight: 70,000).

[SIBS]

"SIBSTAR 102T (Shore A hardness: 25; the content of the styrene component: 15 percent by mass; and weight average molecular weight: 100,000)" provided by Kaneka Corporation was used.

[SIS]

D1161JP (the content of the styrene component: 15 percent by mass; weight average molecular weight: 150,000) provided by Kraton Polymers was used.

[Production of SIBS Modified Copolymer]

Into a 2-liter separable flask, 75 g of a styrene-isobutylene block copolymer (the styrene content: 30%; the number of moles of the styrene unit: 0.216 mol) was input, and the atmosphere in the container was substituted by nitrogen. Using a syringe, 1200 mL of n-hexane dried with molecular sieves and 1800 ml of n-butyl chloride dried with molecular sieves were added.

Next, 30 g (0.291 mol) of methacrylic acid chloride was added using a syringe. Then, 39.4 g (0.295 mol) of aluminum trichloride was added while stirring the solution to start a reaction. After the reaction for 30 minutes, about 1000 ml of water was added to the reaction solution, which was stirred vigorously to terminate the reaction. The reaction solution was washed with a large amount of water several times, and further slowly dropped into a large amount of a methanol-acetone mixed solvent (1:1) to precipitate a reaction product. Then, the reaction product was vacuum dried at 60° C. for 24 hours to obtain a SIBS modified copolymer (weight average molecular weight: 150,000; the styrene content: 20 percent by weight; acid chloride: 1.0 percent by weight).

[Ultraviolet Absorber]

As a benzotriazol-based ultraviolet absorber, "ADK STAB LA-36" provided by ADEKA Corporation (2-(2'-hydroxy-3'-ter-butyl-5'-methylphenyl)-5-chlorobenzotriazol) was used. This ultraviolet absorber has a melting point of 138° C. to 141° C., a molecular weight of 315.8, and a maximum absorption wavelength of 353 nm.

[Antioxidant]

As a hindered phenolic antioxidant, "IRGANOX 1010" provided by BASF (pentaerythrityl tetrakis (3-(3,5-di-t-butyl-4-hydroxyphenyl) propionate) was used. This antioxidant has a melting point of 110° C. to 125° C., a specific gravity of 1.15, and a molecular weight of 117.7.

TABLE 5

| Blending Example of First Layer | | Comparative Blend | | | Example Blend | | | |
|---|---|---|---|---|---|---|---|---|
| | | 1 | 2 | 3 | 1 | 2 | 3 | 4 |
| SIBS | (percent by mass) | 100 | 100 | — | 100 | — | 50 | 50 |
| SIBS Modified | (percent by mass) | — | — | 100 | — | 100 | 50 | 50 |
| Tackifier | (percent by mass) | — | — | — | — | — | 10 | 10 |
| Polyisobutylene | (percent by mass) | — | — | — | — | — | 10 | 10 |
| Ultraviolet Absorber | (percent by mass) | 0.4 | 0.4 | — | 0.5 | 0.5 | 0.5 | 20 |
| Antioxidant | (percent by mass) | — | — | 0.4 | 0.5 | 0.5 | 0.5 | 20 |

TABLE 6

| Blending Example of Second Layer | | Comparative Blend | | | Example Blend | | | | | |
|---|---|---|---|---|---|---|---|---|---|---|
| | | 4 | 5 | 6 | 5 | 6 | 7 | 8 | 9 | 10 |
| SIS | (percent by mass) | 100 | 100 | — | 100 | — | 50 | 50 | 35 | 35 |
| SIB | (percent by mass) | — | — | 100 | — | 100 | — | — | — | — |
| SIBS | (percent by mass) | — | — | — | — | — | 50 | 50 | 35 | 35 |
| SIBS Modified | (percent by mass) | — | — | — | — | — | — | — | 30 | 30 |
| Tackifier | (percent by mass) | — | — | — | — | — | — | 10 | 10 | — |
| Polyisobutylene | (percent by mass) | — | — | — | — | — | — | 10 | 10 | — |

TABLE 6-continued

| Blending Example of | | Comparative Blend | | | Example Blend | | | | | |
|---|---|---|---|---|---|---|---|---|---|---|
| Second Layer | | 4 | 5 | 6 | 5 | 6 | 7 | 8 | 9 | 10 |
| Ultraviolet Absorber | (percent by mass) | — | 0.4 | — | 0.5 | 0.5 | 0.5 | 20 | 20 | 45 |
| Antioxidant | (percent by mass) | — | — | 0.4 | 0.5 | 0.5 | 0.5 | 20 | 20 | 45 |

(Note 1)
Tackifier: C9 petroleum resin, ARKON P140 (provided by Arakawa Chemical Industries Co., Ltd., softening point: 140° C.; weight average molecular weight Mw: 900).
(Note 2)
Polyisobutylene: "Tetrax 3T" provided by Nippon Oil Corporation (viscosity average molecular weight: 30,000; weight average molecular weight: 49,000).

<Method for Manufacturing Inner Liner>

Based on Example Blends and Comparative Blends shown in Tables 5 and 6, thermoplastic elastomer compositions such as the SIBS modified copolymer, SIBS, SIS, and SIB were pelletized using a biaxial extruder (screw diameter: φ50 mm; L/D: 30; cylinder temperature: 220° C.). Thereafter, the inner liner was fabricated using a T-die extruder (screw diameter: φ80 mm; L/D: 50; die gap width: 500 mm; cylinder temperature: 220° C.; film gauge for the first layer: 0.25 mm; film gauge for each of the second layer: 0.05 mm).

Here, in order to adjust the thickness of the inner liner in bead part region Rb and buttress region Rs, a profile was provided at an extrusion opening for the polymer sheet, whereby a sheet in which thickness Gs in the buttress region was made thin was obtained in one piece. This was disposed on the tire inner surface as the inner liner.

<Manufacturing of Pneumatic Tire>

A pneumatic tire of size of 195/65R15 having the basic structure shown in FIG. 1 was manufactured. That is, the above-described polymer layer stack was used for the inner liner to manufacture a raw tire, and the raw tire was press vulcanized at 170° C. for 20 minutes. After cooling at 110° C. for 3 minutes without removing the vulcanized tire from the vulcanization mold, the vulcanized tire was removed from the vulcanization mold. Water was used as a coolant.

Table 5 shows details of Comparative Blends 1 to 6 and Example Blends 1 to 8 of the first layer, and Table 6 shows details of Comparative Blends 7 to 13 and Example Blends 9 to 17 of the second layer. These compositions were used for the first layer and the second layer to manufacture tires of Examples and Comparative Examples. Their specifications and the result of performance evaluations are shown in Tables 7 and 8.

Comparative Examples 3-1 to 3-5, Examples 3-1 to 3-9

In Table 7, each of Comparative Examples 3-1 and 3-2 is an example inner liner in which the SIBS was used for the first layer, the SIS was used for the second layer, and Gs/G was 1 and 0.5, respectively. Comparative Example 3-3 is an example inner liner in which the SIBS was used for the first layer and the SIS was used for the second layer. Comparative Example 3-4 is an example inner liner in which the SIBS was used for the first layer and the SIB was used for the second layer. Comparative Example 3-5 is an example inner liner in which the SIBS modified copolymer was used for the first layer and the SIS was used for the second layer.

Examples 3-1 to 3-4 are example inner liners in which the SIS was used for the second layer and blends (Example Blends 1 to 4) with different elastomer components were used for the first layer. Examples 3-5 to 3-9 are example inner liners in which the SIBS was used for the first layer and blends (Example Blends 6 to 10) with different elastomer components were used for the second layer. It can be seen that Examples 3-1 to 3-9 of the present invention are totally excellent in weather resistance, flection crack growth resistance, air permeability resistance, and rolling resistance.

Comparative Example 3-6, Examples 3-10 to 3-13

In Table 8, Comparative Example 3-6 is an example inner liner in which the same blends as those in Example 3-4 were used for first layer and the second layer, and Gs/G was 1. Examples 3-10 to 3-13 are example inner liners in which the same blends as those in Comparative Example 3-6 were used for first layer and the second layer, and the value of Gs/G was varied. It can be seen that Examples 3-10 to 3-13 are totally superior to Comparative Example 3-6 in weather resistance, flection crack growth resistance, air permeability resistance, and rolling resistance.

TABLE 7

| | | | Comparative Example 3-1 | Comparative Example 3-2 | Comparative Example 3-3 | Comparative Example 3-4 | Comparative Example 3-5 |
|---|---|---|---|---|---|---|---|
| Constitution of Inner Liner | First Layer | Thickness (mm) | 0.6 | 0.3 | 0.3 | 0.3 | 0.3 |
| | | Used Blend | Comparative Blend 1 | Comparative Blend 1 | Comparative Blend 2 | Comparative Blend 2 | Comparative Blend 3 |
| | Second Layer | Thickness (mm) | 0.3 | 0.1 | 0.1 | 0.1 | 0.1 |
| | | Used Blend | Comparative Blend 4 | Comparative Blend 4 | Comparative Blend 4 | Comparative Blend 6 | Comparative Blend 5 |
| | Buttress Portion | Thickness Ratio Gs/Gb | 1 | 0.5 | 0.5 | 0.5 | 0.5 |
| | | Thickness Gs (mm) | 0.9 | 0.2 | 0.2 | 0.2 | 0.2 |
| Performance Evaluation | Weather Resistance (index) | | 100 | 100 | 102 | 103 | 103 |
| | Flection Crack Growth Test (index) | | 100 | 105 | 110 | 115 | 118 |

TABLE 7-continued

|  | | | | | | | | | |
|---|---|---|---|---|---|---|---|---|---|
| Static Air Pressure Decreasing Ratio | | 2.7 | 2.7 | 2.7 | 2.7 | 2.7 | | | |
| Rolling Resistance (index) | | 100 | 102 | 102 | 102 | 102 | | | |
| Overall Judgment | | B | B | B | B | B | | | |

|  |  |  | Example 3-1 | Example 3-2 | Example 3-3 | Example 3-4 | Example 3-5 | Example 3-6 | Example 3-7 | Example 3-8 | Example 3-9 |
|---|---|---|---|---|---|---|---|---|---|---|---|
| Constitution of Inner Liner | First Layer | Thickness (mm) | 0.3 | 0.3 | 0.3 | 0.3 | 0.3 | 0.3 | 0.3 | 0.3 | 0.3 |
| | | Used Blend | Example Blend 1 | Example Blend 2 | Example Blend 3 | Example Blend 4 | Example Blend 1 | Example Blend 1 | Example Blend 1 | Example Blend 1 | Example Blend 1 |
| | Second Layer | Thickness (mm) | 0.1 | 0.1 | 0.1 | 0.1 | 0.1 | 0.1 | 0.1 | 0.1 | 0.1 |
| | | Used Blend | Example Blend 5 | Example Blend 5 | Example Blend 5 | Example Blend 5 | Example Blend 6 | Example Blend 7 | Example Blend 8 | Example Blend 9 | Example Blend 10 |
| | Buttress Portion | Thickness Ratio Gs/Gb | 0.5 | 0.5 | 0.5 | 0.5 | 0.5 | 0.5 | 0.5 | 0.5 | 0.5 |
| | | Thickness Gs (mm) | 0.2 | 0.2 | 0.2 | 0.2 | 0.2 | 0.2 | 0.2 | 0.2 | 0.2 |
| Performance Evaluation | Weather Resistance (index) | | 120 | 120 | 120 | 136 | 120 | 114 | 127 | 127 | 105 |
| | Flection Crack Growth Test (index) | | 128 | 130 | 129 | 166 | 130 | 132 | 150 | 140 | 120 |
| | Static Air Pressure Decreasing Ratio | | 2.7 | 2.7 | 2.7 | 2.7 | 2.7 | 2.7 | 2.7 | 2.7 | 2.7 |
| | Rolling Resistance (index) | | 102 | 102 | 102 | 102 | 102 | 102 | 102 | 102 | 102 |
| | Overall Judgment | | A | A | A | A | A | A | A | A | A |

TABLE 8

|  |  |  | Comparative Example 3-6 | Comparative Example 3-10 | Example 3-11 | Example 3-12 | Example 3-13 |
|---|---|---|---|---|---|---|---|
| Constitution of Inner Liner | First Layer | Layer Thickness (mm) | 0.3 | 0.3 | 0.3 | 0.3 | 0.3 |
| | | Used Blend | Example Blend 4 | Example Blend 4 | Example Blend 4 | Example Blend 4 | Example Blend 4 |
| | Second Layer | Layer Thickness (mm) | 0.1 | 0.1 | 0.1 | 0.1 | 0.1 |
| | | Used Blend | Example Blend 5 | Example Blend 5 | Example Blend 5 | Example lend 5 | Example Blend 5 |
| | Buttress Portion | Thickness Ratio Gs/Gb | 1 | 0.75 | 0.65 | 0.55 | 0.4 |
| | | Thickness Gs (mm) | 0.4 | 0.3 | 0.26 | 0.22 | 0.16 |
| Performance Evaluation | Weather Resistance (index) | | 136 | 136 | 136 | 136 | 136 |
| | Flection Crack Growth Test (index) | | 118 | 140 | 155 | 160 | 124 |
| | Static Air Pressure Decreasing Ratio | | 2.7 | 2.7 | 2.7 | 2.7 | 2.8 |
| | Rolling Resistance (index) | | 101 | 102 | 102 | 102 | 103 |
| | Overall Judgment | | B | A | A | A | A |

It is noted that in Tables 7 and 8, the values of the layer thickness of the first layer and the layer thickness of the second layer each indicate an average thickness from the tire crown portion to the bead portion except the buttress region (Rs).

<Performance Test>

For each of the pneumatic tires manufactured as described above, the following performance test was conducted.

<Weather Resistant Test>

The inside of the tire inner liner was subjected to a weather resistance test using a Sunshine Super Long-Life Weather Meter provided by Suga Test Instruments Co., Ltd. under the following conditions. Each inner liner was irradiated for 60 hours under the conditions at a bath inside temperature of 63° C., at a humidity of 50%, at 60° C., and with rainfall for 12 minutes. The number of cracks in the inner liner after the test was obtained. With Comparative Example 3-1 being regarded as a reference, relative values of the number of cracks of other Comparative Examples and Examples were obtained, and a weather resistance index was calculated based on the following expression. As the value is larger, the weather resistance is more excellent.

Weather Resistance Index=(the Number of Cracks in Comparative Example 3-1)/(the Number of Cracks in Each Example)×100.

<Flection Crack Growth Test>

In endurance traveling test, evaluation was made depending on whether the inner liner was cracked or detached. Each trial tire was assembled to a JIS specification rim 15×6JJ. The tire internal pressure was set at 150 KPa, which was lower internal pressure than normal internal pressure. The load was set at 600 kg. The speed was set at 100 km/h. The travel distance was set at 20,000 km. The inside of the tire was observed to measure the number of cracks and detachments. With Comparative Example 3-1 being regarded as a reference, crack growth in each Comparative Example and each Example was indicated by an index. As the value of the index is larger, the flection crack growth is smaller.

Flection Crack Growth Index=(the Number of Cracks in Comparative Example 3-1)/(the Number of Cracks in Each Example)×100

<Static Air Pressure Decreasing Ratio Test>

A 195/65R15 steel radial PC tire produced by the above-described method was assembled to a JIS specification rim 15×6JJ, and air was introduced thereinto at an initial air pressure of 300 Kpa. Then, the tire was left for 90 days at a room temperature. Then, the air pressure decreasing ratio was calculated.

<Measurement of Average Thickness>

The 195/65R15 steel radial PC tire was equally divided into eight in the circumferential direction. In each of the divided portions, eight cut samples were made by cutting it in the tire radial direction with a width of 20 mm. For each of the eight cut samples, the thickness of the inner liner was measured at five points with an equal interval in each of buttress region Rs and bead region Rb. Arithmetic mean values of the measured values at the total of 40 points each were determined as Gs and Gb, respectively.

<Rolling Resistance Index>

Each trial tire was assembled to a JIS specification rim 15×6JJ, and a rolling resistance tester provided by Kobe Steel Ltd. was used to measure rolling resistance thereof while performing traveling at a room temperature (38° C.) under the conditions of a load of 3.4 kN, an air pressure of 230 kPa, and a speed of 80 km/h. Based on the below-described equation, the rolling resistance change ratio (%) of each Example was indicated by an index with Comparative Example 3-1 being regarded as a reference 100. It is shown that as the rolling resistance change ratio is larger, the rolling resistance is further reduced.

Rolling Resistance Index=(Rolling Resistance of Comparative Example 3-1)/(Rolling Resistance of Example)×100

<Overall Judgment>

A tire that satisfied all of the following conditions was judged as A.

(a) weather resistance index of more than or equal to 105;
(b) flection crack growth index of more than or equal to 120;
(c) static air pressure decreasing ratio of less than 2.7; and
(d) rolling resistance index of more than or equal to 105.

A tire that satisfied any one of the following conditions was judged as B. When plural judgments applied, a lower evaluation was adopted.

(a) weather resistance index of less than 100;
(b) flection crack growth index of less than 120;
(c) static air pressure decreasing ratio of more than or equal to 2.7; and
(d) rolling resistance index of less than 105.

INDUSTRIAL APPLICABILITY

The pneumatic tire of the present invention can be used as a pneumatic tire for track/bus and a pneumatic tire for heavy vehicle, besides a pneumatic tire for passenger car.

REFERENCE SIGNS LIST 1 pneumatic tire; 2 tread portion; 3 sidewall portion; 4 bead portion; 5 bead core; 6 carcass ply; 7 belt layer; 8 bead apex; 9 inner liner; Rb bead region; Rs buttress region; Le tire largest width position; Lt bead toe; Lu corresponding position at belt layer end; PL polymer layer stack; PL1 first layer; PL2 second layer.

The invention claimed is:

1. A pneumatic tire comprising an inner liner disposed on an inner side of the tire, said inner liner being composed of a sheet made of an elastomer composition containing an elastomer component in which a styrene-isobutylene-styrene triblock copolymer by more than or equal to 7 percent by mass and less than or equal to 93 percent by mass and an isobutylene-based modified copolymer containing a β-pinene component by more than or equal to 7 percent by mass and less than or equal to 93 percent by mass are mixed, and in said inner liner, a ratio Gs/Gb between an average thickness Gb in a bead region Rb extending from a tire largest width position to a bead toe and an average thickness Gs in a buttress region Rs extending from the tire largest width position to a corresponding position Lu at a belt layer end being 0.30 to 0.75, wherein said inner liner consists of one layer,
said inner liner is located in contact with a carcass ply, and
no additional layers exist between said inner liner and said carcass ply.

2. The pneumatic tire according to claim 1, wherein said styrene-isobutylene-styrene triblock copolymer contains a styrene component at a content of 10 percent by mass to 30 percent by mass, and has a weight average molecular weight of 50,000 to 400,000.

3. The pneumatic tire according to claim 1, wherein the isobutylene-based modified copolymer is contained by more than or equal to 10 percent by mass and less than or equal to 90 percent by mass in the elastomer component of said elastomer composition.

4. The pneumatic tire according to claim 1, wherein β-pinene in said isobutylene-based modified copolymer is contained at a content of 0.5 percent by weight to 25 percent by weight.

5. The pneumatic tire according to claim 1, wherein said isobutylene-based modified copolymer has a weight average molecular weight Mw of 30,000 to 300,000, and a value of a molecular weight distribution (weight average molecular weight Mw/number average molecular weight Mn) is less than or equal to 1.3.

6. The pneumatic tire according to claim 1, wherein the average thickness Gs in the buttress region of said inner liner is 0.05 mm to 0.45 mm.

* * * * *